United States Patent
Takahashi

(10) Patent No.: US 9,257,063 B2
(45) Date of Patent: Feb. 9, 2016

(54) DISPLAY UNIT

(71) Applicant: Sony Corporation, Tokyo (JP)

(72) Inventor: Kenichi Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 659 days.

(21) Appl. No.: 13/632,667

(22) Filed: Oct. 1, 2012

(65) Prior Publication Data
US 2013/0088529 A1 Apr. 11, 2013

(30) Foreign Application Priority Data

Oct. 5, 2011 (JP) .................................. 2011-221412

(51) Int. Cl.
| | |
|---|---|
| G09G 3/00 | (2006.01) |
| H04N 13/04 | (2006.01) |
| G09G 3/34 | (2006.01) |
| G02B 27/22 | (2006.01) |
| G02F 1/139 | (2006.01) |
| G02F 1/19 | (2006.01) |

(52) U.S. Cl.
CPC .............. *G09G 3/003* (2013.01); *G09G 3/3406* (2013.01); *H04N 13/0411* (2013.01); *H04N 13/0415* (2013.01); *H04N 13/0454* (2013.01); *H04N 13/0456* (2013.01); *G02B 27/2214* (2013.01); *G02F 1/1393* (2013.01); *G02F 1/19* (2013.01)

(58) Field of Classification Search
CPC ........... H04N 13/00; G02F 1/13; G02F 1/133; G02F 1/13718; G09G 3/364; G09G 5/10
See application file for complete search history.

(56) References Cited

U.S. PATENT DOCUMENTS

2012/0013606 A1* 1/2012 Tsai et al. ..................... 345/419

FOREIGN PATENT DOCUMENTS

JP 2011-142065 7/2011

OTHER PUBLICATIONS

Kang et al., "A Novel Polarizer Glasses-type 3D Displays with a Patterned Retarder", SID 10 Digest, 2010, pp. 1-4.*

* cited by examiner

*Primary Examiner* — William Boddie
*Assistant Examiner* — Jeffrey A Parker
(74) *Attorney, Agent, or Firm* — K&L Gates LLP

(57) ABSTRACT

A display unit includes: a display panel; an illumination device illuminating the display panel; and a drive circuit driving the display panel and the illumination device. The illumination device includes a light modulation layer, and a first electrode and a second electrode sandwiching the light modulation layer therebetween, the first electrode and the second electrode each include a plurality of strip-like electrodes. The strip-like electrodes of the first electrode and the strip-like electrodes of the second electrode extend in directions intersecting with each other, and the drive circuit drives the respective strip-like electrodes to allow an in-plane distribution of a potential difference between the strip-like electrodes of the first electrode and the strip-like electrodes of the second electrode to be constant within one frame period, when a two-dimensional image, a three-dimensional image, or an image including a two-dimensional image and a three-dimensional image is displayed on the display panel.

6 Claims, 31 Drawing Sheets

DISPLAY UNIT

CROSS REFERENCES TO RELATED APPLICATIONS

The present application claims priority to Japanese Priority Patent Application JP 2011-221412 filed in the Japan Patent Office on Oct. 5, 2011, the entire content of which is hereby incorporated by reference.

BACKGROUND

The present disclosure relates to a display unit capable of performing two-dimensional display (planar display) and three-dimensional display (stereoscopic display).

Display units capable of performing three-dimensional display include display units in need of wearing special glasses for three-dimensional display and display units without need of the special glasses. In the latter display units, for example, a lenticular lens or a parallax barrier is used to allow a viewer to perceive a stereoscopic image with naked eyes. When image information is distributed into right and left eyes by the lenticular lens or the parallax barrier, the respective right and left eyes see different images, and as a result, three-dimensional display is achievable.

In the display units capable of performing three-dimensional display, as in the case of display units performing only two-dimensional display in related art, higher image quality and a reduction in thickness are desired. Therefore, for example, in Japanese Unexamined Patent Application Publication No. 2011-142065 proposes a method of partially modulating light intensity of a backlight in an edge-light method.

The backlight described in Japanese Unexamined Patent Application Publication No. 2011-142065 includes a light guide plate, a light source disposed on a side surface of the light guide plate, a light modulation device adhered to the light guide plate, and a drive circuit driving the light modulation device. The light modulation device is configured of a polymer dispersed liquid crystal (PDLC) and a pair of electrodes sandwiching the PDLC therebetween. The electrodes each are configured of a plurality of strip-like electrodes, and strip-like electrodes above the PDLC and strip-like electrodes below the PDLC are disposed to be orthogonal to each other. For example, the drive circuit drives each of strip-like electrodes by a simple-matrix driving method to switch a part of the PDLC into a scattering state or a transparent state, thereby allowing a scattering region of the PDLC to emit illumination light.

SUMMARY

In the backlight described in Japanese Unexamined Patent Application Publication No. 2011-142065, to partially emit illumination light from a smaller region of a plane, it is necessary to increase the number of strip-like electrodes. However, the more the number of strip-like electrodes is increased, the more difficult it is to drive all strip-like electrodes by a simple-matrix driving method for a short time. Therefore, it is considered that a planar electrode (a solid film) is used as one electrode, and an electrode configured of a plurality of small electrodes which are two-dimensionally arranged is used as the other electrode, and a TFT is connected to each of the small electrodes to drive each of the small electrodes by an active-matrix diving method. However, in such a case, cost of manufacturing the backlight is increased.

It is desirable to provide a display unit capable of partially emitting illumination light from a smaller region of a plane at low cost.

According to an embodiment of the disclosure, there is provided a display unit including: a display panel displaying an image; an illumination device illuminating the display panel; and a drive circuit driving the display panel and the illumination device. The illumination device includes a first transparent substrate and a second transparent substrate being separated from and facing each other, and a light source emitting light to an end surface of the first transparent substrate or the second transparent substrate. The illumination device further includes a light modulation layer disposed in a gap between the first transparent substrate and the second transparent substrate, and exhibiting a scattering property or transparency with respect to light from the light source, depending on a potential difference, and a first electrode and a second electrode sandwiching the light modulation layer therebetween. The first electrode and the second electrode each include a plurality of strip-like electrodes. The strip-like electrodes of the first electrode and the strip-like electrodes of the second electrode extend in directions intersecting with each other. The drive circuit drives the respective strip-like electrodes to allow an in-plane distribution of a potential difference between the strip-like electrodes of the first electrode and the strip-like electrodes of the second electrode to be constant within one frame period, when a two-dimensional image, a three-dimensional image, or an image including a two-dimensional image and a three-dimensional image is displayed on the display panel.

In the display unit according to the embodiment of the disclosure, the light modulation layer exhibiting the scattering property or transparency with respect to light from the light source, depending on a potential difference generated by strip-like electrodes is provided in the illumination device. Therefore, light emitted from the light source and propagating through the first transparent substrate and the like passes through a region exhibiting transparency by potential difference control of the light modulation layer to be totally reflected by a top surface of the illumination device or to be reflected by the top surface of the illumination device with high reflectivity. On the other hand, light propagating through the first transparent substrate and the like is scattered in a region exhibiting the scattering property by potential difference control of the light modulation layer to pass through the top surface of the illumination device. Therefore, illumination light is hardly emitted from a region corresponding to the region exhibiting transparency in a light emission region of the illumination device (hereinafter simply referred to "transparent region in the light emission region"). Moreover, illumination light is emitted from a region corresponding to the region exhibiting the scattering property in the light emission region of the illumination device (hereinafter simply referred to as "scattering region in the light emission region"). Thus, in the display unit according to the embodiment of the disclosure, illumination light is emitted from a part of the light modulation layer or the entire light modulation layer, depending on the layout of strip-like electrodes and an applied voltage; therefore, switching between three-dimensional display and two-dimensional display is performed. Moreover, in the embodiment of the disclosure, when a two-dimensional image, a three-dimensional image, or an image including a two-dimensional image and a three-dimensional image is displayed on the display panel, respective strip-like electrodes are driven to allow an in-plane distribution of a potential difference between the strip-like electrodes of the first electrode and the strip-like electrodes of the second electrode to be constant within one frame period. Thus, the number of strip-like electrodes is not limited by a driving method.

In the display unit according to the embodiment of the disclosure, switching between three-dimensional display and two-dimensional display is performed by potential difference control on the light modulation layer, and the number of strip-like electrodes is not limited by the driving method; therefore, the number of strip-like electrodes is increased as necessary to allow a region where illumination light is partially emitted in a plane to be smaller. Thus, illumination light is partially emitted from a smaller region of the plane at low cost.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the technology, and are incorporated in and constitute a part of this specification. The drawings illustrate embodiments and, together with the specification, serve to explain the principles of the technology.

DETAILED DESCRIPTION

Preferred embodiments of the disclosure will be described in detail below referring to the accompanying drawings. It is to be noted that description will be given in the following order.

1. First Embodiment

An example in which a light modulation layer in a backlight is in a normally black mode and in a horizontal alignment mode 2. Second Embodiment An example in which the light modulation layer in the backlight is in the normally black mode and in a vertical alignment mode 3. Third Embodiment An example in which the light modulation layer in the backlight is in a normally white mode 4. Modifications An example in which time-divisional drive is used in three-dimensional display Variations of position of the light modulation device in the backlight (1. First Embodiment)

[Configuration of Television Broadcast signal transmitter-and-receiver System]

Figure 1:
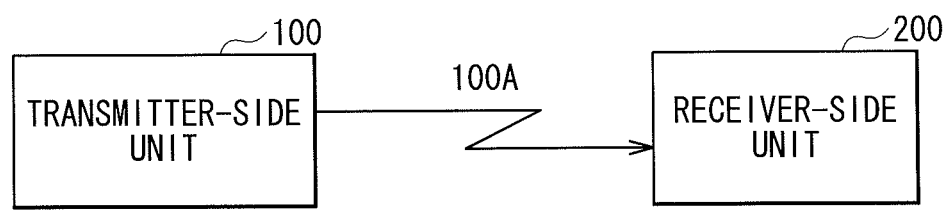
FIG. 1 is a diagram illustrating an example of a television broadcast signal transmitter-and-receiver system according to an embodiment of the disclosure.

FIG. 1 is a block diagram illustrating a configuration example of a transmitter-and-receiver system, which includes a receiver-side unit 200 according to a first embodiment of the disclosure, with use of a television broadcast signal 100A. The transmitter-and-receiver system includes a transmitter-side unit 100 transmitting a television broadcast signal 100A through, for example, wired communication (such as cable TV) or wireless communication (such as terrestrial digital waves or satellite waves), and the receiver-side unit 200 receiving the television broadcast signal 100A from the transmitter-side unit 100 through the above-described wired or wireless communication. It is to be noted that the receiver-side unit 200 corresponds to a specific but not limitative example of "display unit" in the disclosure.

The television broadcast signal 100A includes image data for two-dimensional display (planar display) or image data for three-dimensional display (stereoscopic display). In this description, the image data for two-dimensional display refers to two-dimensional image data without perspective information. Moreover, the image data for three-dimensional display refers to two-dimensional image data with perspective information, and the image data for three-dimensional display includes plural sets of two-dimensional image data with perspectives different from one another. The transmitter-side unit 100 is, for example, a television broadcast signal transmitter installed in a broadcasting station, or a server on the Internet.

[Functional Block of Receiver-side unit 200]

Figure 2:
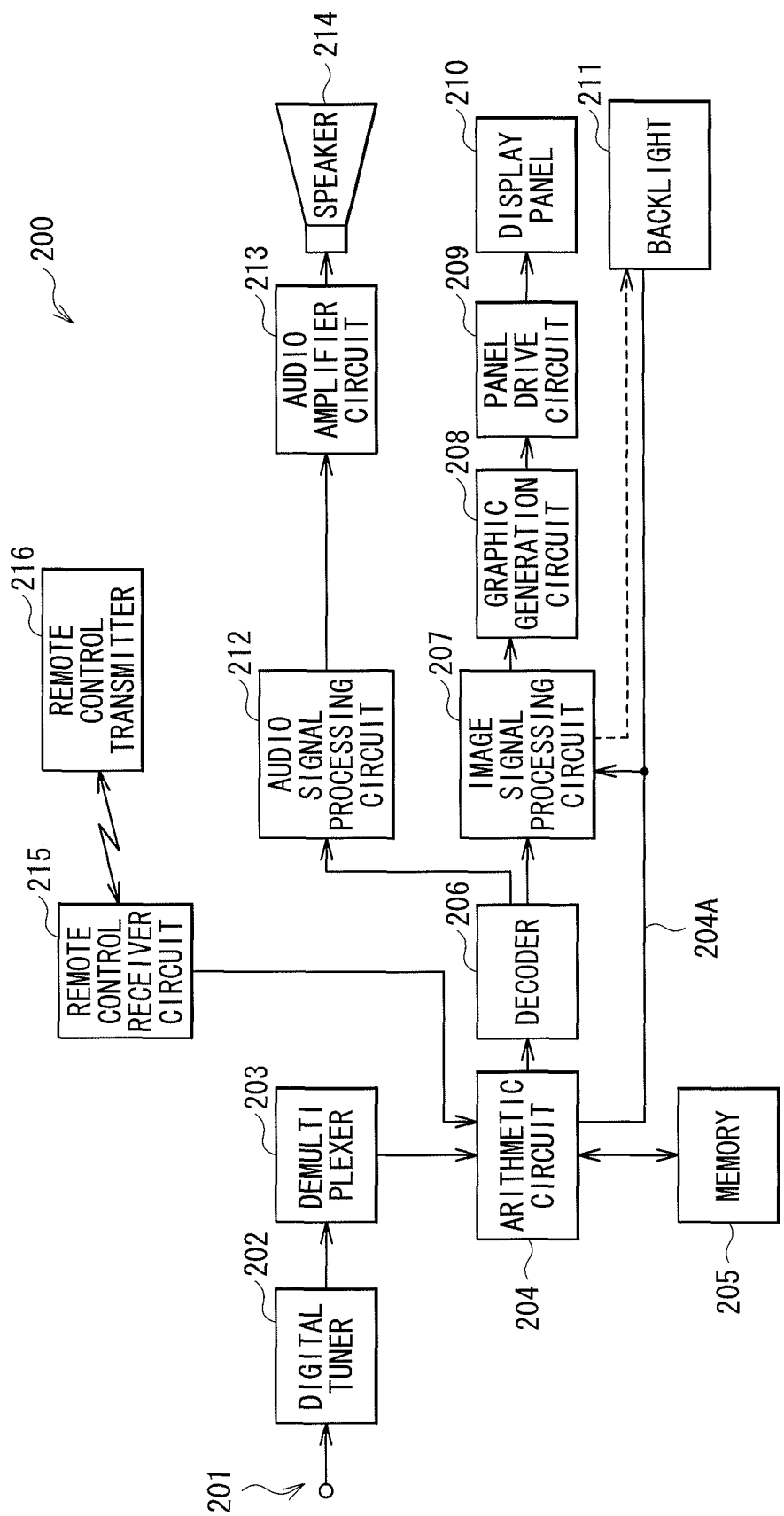
FIG. 2 is a diagram illustrating an example of functional blocks of a receiver-side unit in FIG. 1.

FIG. 2 is a block diagram of a configuration example of the receiver-side unit 200. The receiver-side unit 200 is, for example, a television capable of being connected to the above-described wired or wireless communication. The receiver-side unit 200 includes, for example, an antenna terminal 201, a digital tuner 202, a demultiplexer 203, an arithmetic circuit 204, and a memory 205. The receiver-side unit 200 further includes, for example, a decoder 206, an image signal processing circuit 207, a graphic generation circuit 208, a panel drive circuit 209, a display panel 210, a backlight 211, an audio signal processing circuit 212, an audio amplifier circuit 213, and a speaker 214. The receiver-side unit 200 further includes, for example, a remote control receiver circuit 215 and a remote control transmitter 216.

The antenna terminal 201 is a terminal inputting the television broadcast signal 100A received by a receiving antenna (not illustrated). For example, the digital tuner 202 processes the television broadcast signal 100A having entered into the antenna terminal 201 to output a predetermined transport stream associated with a channel selected by a user. For example, the demultiplexer 203 extracts a partial TS (Transport Stream) associated with the channel selected by the user from the transport stream obtained in the digital tuner 202.

The arithmetic circuit 204 controls operations of respective components of the receiver-side unit 200. For example, the arithmetic circuit 204 allows the memory 205 to hold the partial TS obtained by the demultiplexer 203, or transmits the partial TS read from the memory 205 to the decoder 206. Moreover, for example, the arithmetic circuit 204 transmits a control signal 204A specifying two-dimensional display or three-dimensional display to the image signal processing circuit 207 and the backlight 211. The arithmetic circuit 204 determines the above-described control signal 204A based on, for example, setting information stored in the memory 205, predetermined information included in the partial TS, or setting information supplied from the remote control receiver circuit 215.

For example, the memory 205 holds the setting information of the receiver-side unit 200 and manages data. The memory 205 holds, for example, the partial TS obtained by the demultiplexer 203 or setting information such as display method.

For example, the decoder 206 performs a decoding process on an image PES (Packetized Elementary Stream) packet included in the partial TS which is obtained by the demultiplexer 203 to obtain image data. For example, the decoder 206 also performs a decoding process on an audio PES packet included in the partial TS which is obtained by the demultiplexer 203 to obtain audio data. In this description, the image data refers to image data for two-dimensional display or image data for three-dimensional display.

For example, the image signal processing circuit 207 and the graphic generation circuit 208 perform, as necessary, multiple image processing, a graphic data superimposing process, or the like on the image data obtained by the decoder 206.

In the case where the image signal processing circuit 207 receives a signal specifying three-dimensional display as the control signal 204A from the arithmetic circuit 204, and image data supplied from the decoder 206 is image data for three-dimensional display, the image signal processing circuit 207 generates, for example, one set of two-dimensional image data with use of plural sets of two-dimensional image data with perspectives different from one another included in the image data for three-dimensional display supplied from the decoder 206 to select the generated two-dimensional image data as image data which is to be supplied to the graphic generation circuit 208. For example, in the case where the image data for three-dimensional display includes two sets of two-dimensional image data with perspectives different from each other, the image signal processing circuit 207 performs a process of alternately arranging the two sets of two-dimensional image data in a horizontal direction from one row to another to generate one set of image data in which the two sets of two-dimensional image data are alternately arranged in the horizontal direction. Likewise, for example, in the case where the image data for three-dimensional display includes four sets of two-dimensional image data with perspectives different from one another, the image signal processing circuit 207 performs a process of periodically and alternately arranging the four sets of two-dimensional image data in the horizontal direction from one row to another to generate one set of image data in which four sets of two-dimensional image data are periodically and alternately arranged in the horizontal direction.

In the case where the image signal processing circuit 207 receives a signal specifying two-dimensional display as the control signal 204A from the arithmetic circuit 204, and image data supplied from the decoder 206 is image data for three-dimensional display, for example, the image signal processing circuit 207 selects, as image data which is to be supplied to the graphic generation circuit 208, one set of image data from plural sets of two-dimensional image data with perspectives different from one another which are included in image data for three-dimensional display supplied from the decoder 206. In the case where the image signal processing circuit 207 receives the signal specifying two-dimensional display as the control signal 204A from the arithmetic circuit 204, and the image data supplied from the decoder 206 is image data for two-dimensional display, for example, the image signal processing circuit 207 selects image data for two-dimensional display supplied from the decoder 206 as image data which is to be supplied to the graphic generation circuit 208.

In the case where the image signal processing circuit 207 receives a signal specifying partial three-dimensional display as the control signal 204A from the arithmetic circuit 204 together with region information of a three-dimensional display region, and image data supplied from the decoder 206 is image data for three-dimensional display, for example, the image signal processing circuit 207 generates one set of two-dimensional image data with use of plural sets of data associated with the above-described region information in plural sets of two-dimensional image data with perspectives different from one another which are included in image data for three-dimensional display supplied from the decoder 206. Moreover, for example, the image signal processing circuit 207 selects one set of image data from plural sets of data not associated with the above-described region information in the plural sets of two-dimensional image data with perspectives different from one another which are included in the image data for three-dimensional display supplied from the decoder 206. Then, the image signal processing circuit 207 combines the generated two-dimensional image data and the selected image data with each other to generate one set of image data, and the one set of image data is selected as image data which is to be supplied to the graphic generation circuit 208.

The graphic generation circuit 208 generates, for example, a UI (User Interface) screen which is to be used for screen display. For example, the panel drive circuit 209 drives the display panel 210 based on image data supplied from the graphic generation circuit 208.

Configurations of the display panel 210 and the backlight 211 will be described in detail later. For example, the audio signal processing circuit 212 performs a process such as D/A conversion on audio data obtained by the decoder 206. The audio amplifier circuit 213 amplifies, for example, an audio signal supplied from the audio signal processing circuit 212 to supply the amplified audio signal to the speaker 214.

The remote control receiver circuit 215 receives, for example, a remote control signal transmitted from the remote control transmitter 216 to supply the remote control signal to the arithmetic circuit 204. The arithmetic circuit 204 controls, for example, respective components of the receiver-side unit 200 in response to the remote control signal.

[Sectional Configuration of Receiver-side Unit 200]

Figure 3:
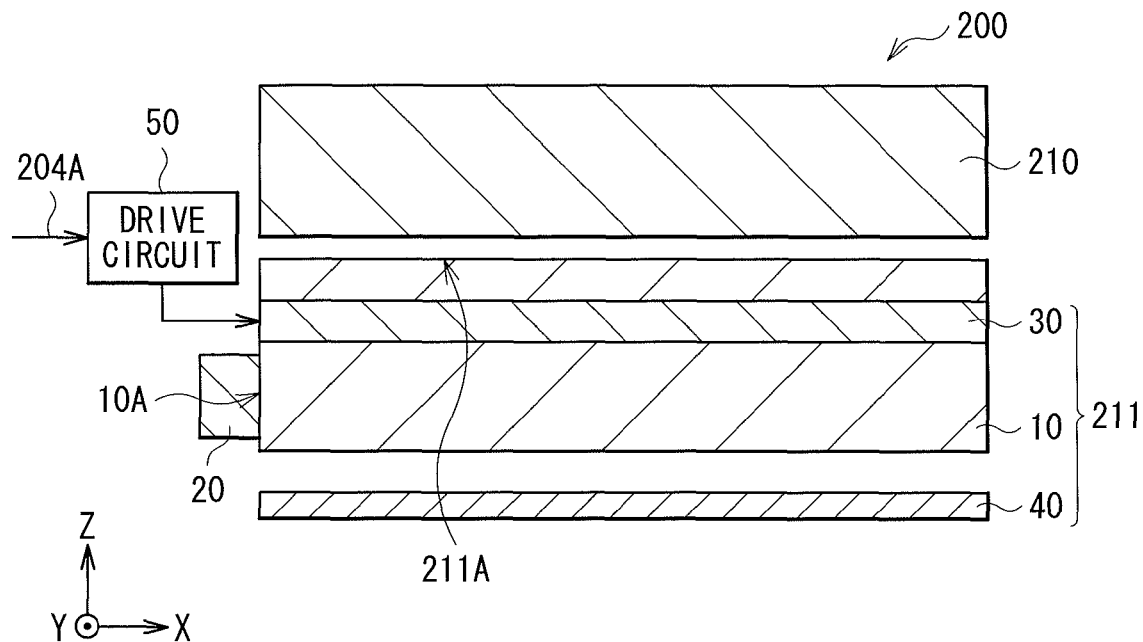
FIG. 3 is a sectional view illustrating an example of a configuration of a display section in the receiver-side unit in FIG. 1.

FIG. 3 illustrates an example of a sectional configuration of a display section of the receiver-side unit 200. It is to be noted that FIG. 3 is a schematic illustration, and dimensions and shapes in the illustration are not necessarily the same as actual dimensions and shapes. The receiver-side unit 200 includes the display panel 210 and the backlight 211 disposed behind the display panel 210.

The display panel 210 includes a plurality of pixels which are two-dimensionally arranged, and displays an image by drives of respective pixels or specific pixels. The display panel 210 is, for example, a transmissive liquid crystal display panel (LCD) in which respective pixels or specific pixels are driven based on an image signal, and has a configuration in which a liquid crystal layer is sandwiched between a pair of transparent substrates. Although not illustrated, the display panel 210 includes a polarization plate, a transparent substrate, pixel electrodes, an alignment film, a liquid crystal layer, an alignment film, a common electrode, a color filter, a transparent substrate, and a polarization plate in order from a side closer to the backlight 211.

Figure 13:
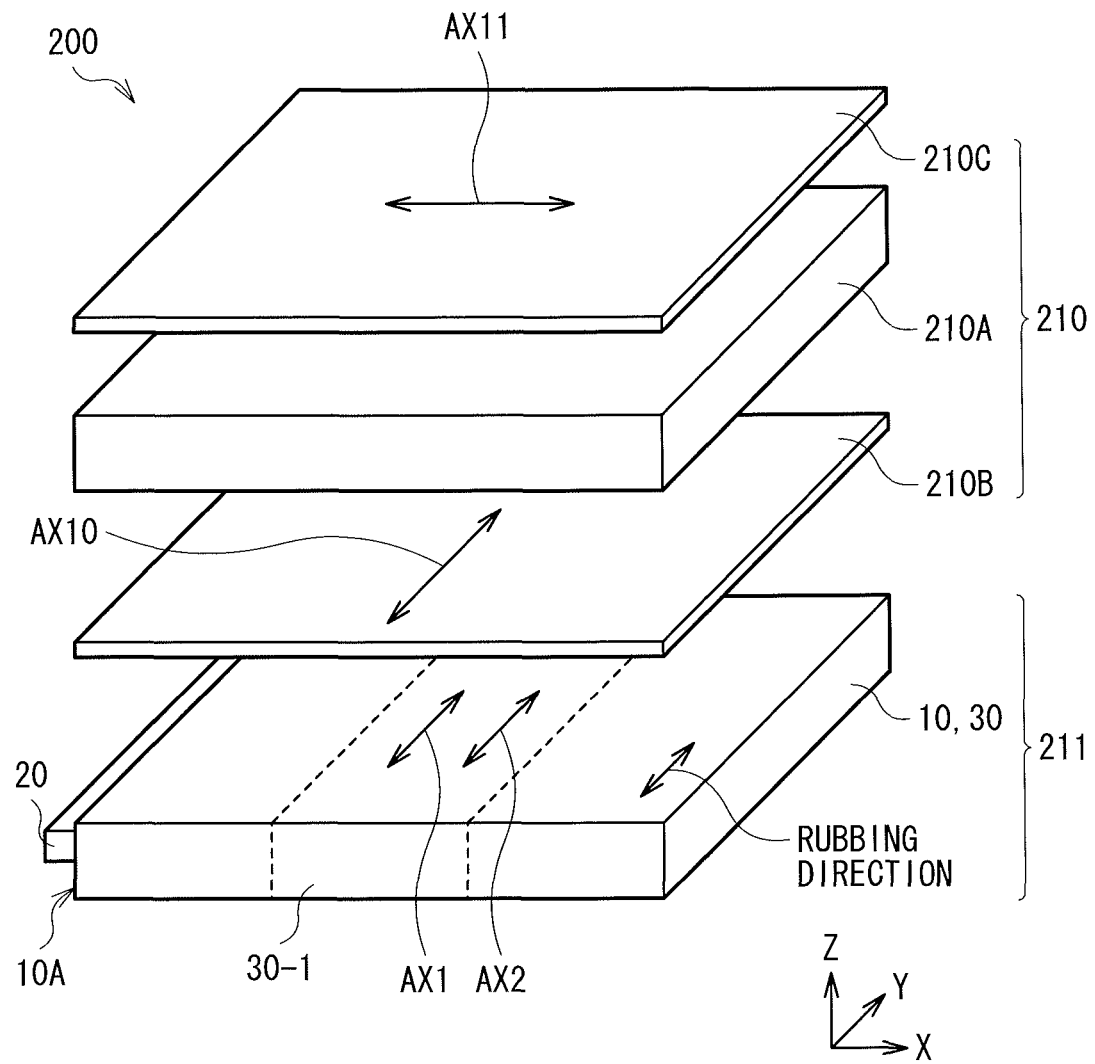
FIG. 13 is a perspective view illustrating an example of a relationship between a polarizing direction of illumination light and a polarizing axis of a lower polarizing plate of a display panel.

It is to be noted that the polarizing plate located closer to the backlight 211 corresponds to a polarizing plate 210B which will be described later (refer to FIG. 13), and the polarizing plate located closer to an image display plane corresponds to a polarizing plate 210C which will be described later (refer to FIG. 13). Moreover, a section sandwiched between the pair of polarizing plates in the display panel 210 (more specifically, a laminate section configured of the transparent substrate, the pixel electrodes, the alignment film, the liquid crystal layer, the alignment film, the common electrode, the color filter, and the transparent substrate) corresponds to a liquid crystal panel 210A which will be described later (refer to FIG. 13).

The transparent substrates are configured of substrates transparent to visible light, for example, plate glass. It is to be noted that, for example, an active drive circuit (not illustrated) including TFTs (thin film transistors), wiring, and the like electrically connected to the pixel electrodes is formed on the transparent substrate located closer to the backlight 211. The pixel electrodes and the common electrode are made of, for example, indium tin oxide (ITO). The pixel electrodes are two-dimensionally arranged on the transparent substrate, and function as electrodes for respective pixels. On the other hand, the common electrode is formed on an entire surface of the color filter, and functions as a common electrode facing the respective pixel electrodes. The alignment films are made of a polymer material such as polyimide, and perform an alignment process on a liquid crystal.

The liquid crystal layer is made of, for example, a VA (Vertical Alignment) mode, TN (Twisted Nematic) mode, or STN (Super Twisted Nematic) mode liquid crystal, and has a function of changing the direction of a polarizing axis of emitted light from the backlight 211 in each pixel by an applied voltage from the drive circuit (not illustrated). It is to be noted that liquid crystal alignment is changed in a stepwise manner to adjust the direction of a transmission axis of each pixel in a stepwise manner. In the color filter, color filters separating light having passed through the liquid crystal layer into, for example, three primary colors of red (R), green (G), and blue (B), or four colors such as R, G, B, and white (W), respectively, are arranged corresponding to the arrangement of the pixel electrodes.

The polarization plates are optical shutters of one kind, and allow only light (polarized light) in a certain vibration direction to pass therethrough. It is to be noted that the polarization plates may be absorption polarizers absorbing light (polarized light) in a vibration direction other than a transmission axis; however, the polarization plates are preferably reflective polarizers reflecting light toward the backlight 211 in terms of an improvement in luminance. The two polarization plates are disposed to allow their polarizing axes to be different by 90° from each other, thereby allowing emitted light from the backlight 211 to pass therethrough via the liquid crystal layer, or to be shielded.

The backlight 211 illuminates, for example, the display panel 210 from a back side thereof, and includes a light guide plate 10, a light source 20 disposed on a side surface of the light guide plate 10, a light modulation device 30 and a reflective plate 40 disposed in the light guide plate 10, and a drive circuit 50 driving the light modulation device 30. It is to be noted that the light guide plate 10 corresponds to a specific but not limitative example of "first transparent substrate" or "second transparent substrate" in the disclosure.

The light guide plate 10 guides light from the light source 20 disposed on the side surface of the light guide plate 10 to a top surface of the light guide plate 10. The light guide plate 10 has a shape corresponding to the display panel 210 disposed on the top surface of the light guide plate 10, for example, a rectangular parallelepiped shape surrounded by a top surface, a bottom surface, and side surfaces. It is to be noted that a side surface where light from the light source 20 enters of the side surfaces of the light guide plate 10 is hereinafter referred to as "light incident surface 10A". It is to be noted that, in the case where a voltage applied to the backlight 211 is modulated to uniformize luminance, a flat light guide plate which is not patterned may be used as the light guide plate 10. The light guide plate 10 is formed by mainly including a transparent thermoplastic resin such as a polycarbonate resin (PC) or an acrylic resin (polymethylmethacrylate (PMMA)).

Figure 4A:
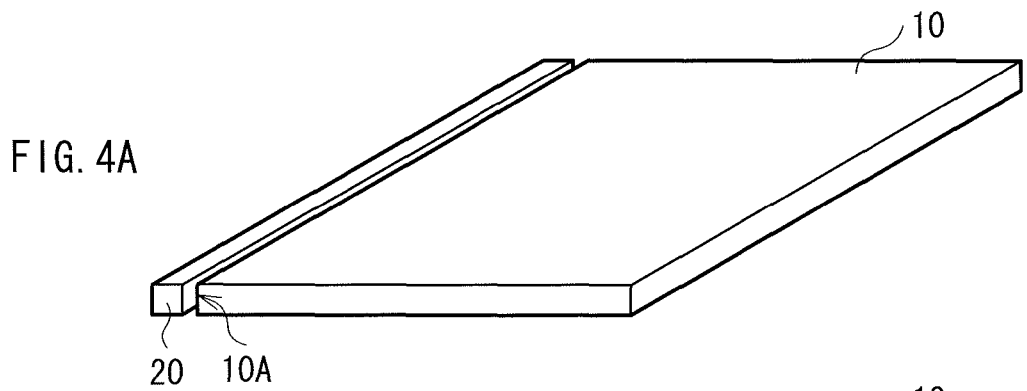
FIGS. 4A and 4B are perspective views illustrating examples of arrangement of a light source in FIG. 3.
Figure 4B:
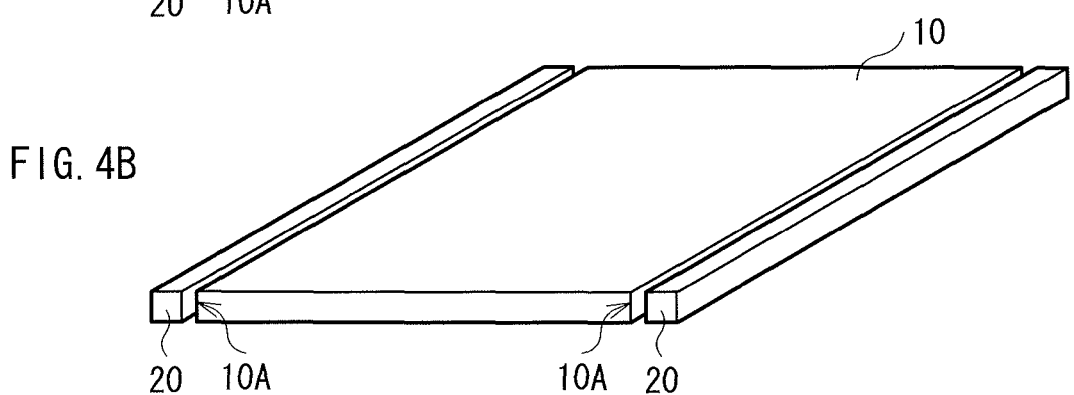

The light source 20 is a linear light source, and is configured of, for example, a hot cathode fluorescent lamp (HCFL), a cold cathode fluorescent lamp (CCFL), or a plurality of LEDs (Light Emitting Diodes) linearly arranged. In the case where the light source 20 is configured of a plurality of LEDs, all of the LEDs are preferably white LEDs in terms of efficiency, a reduction in thickness, and uniformity. It is to be noted that the light source 20 may be configured of, for example, red LEDs, green LEDs, and blue LEDs. The light source 20 may be disposed on only one side surface of the light guide plate 10 (refer to FIGS. 3 and 4A), or on two side surfaces (refer to FIG. 4B), three side surfaces, or all side surfaces of the light guide plate 10. Moreover, in the case where the light sources 20 are disposed on three side surfaces or all side surfaces, only light sources 20 disposed on two facing side surfaces may illuminate when partial lighting is performed, and all light sources 20 may illuminate when entire lighting is performed.

The reflective plate 40 returns light leaked from the back side of the light guide plate 10 through the light modulation device 30 toward the light guide plate 10, and has, for example, functions such as reflection, diffusion, and scattering. Thus, the reflective plate 40 allows light emitted from the light source 20 to be efficiently used, and is also useful to improve front luminance. The reflective plate 40 is made of, for example, foamed PET (polyethylene terephthalate), a silver-evaporated film, a multilayer reflective film, or white PET. It is to be noted that, for example, as will be described later, the reflective plate 40 may not be included, as necessary.

Figure 5:
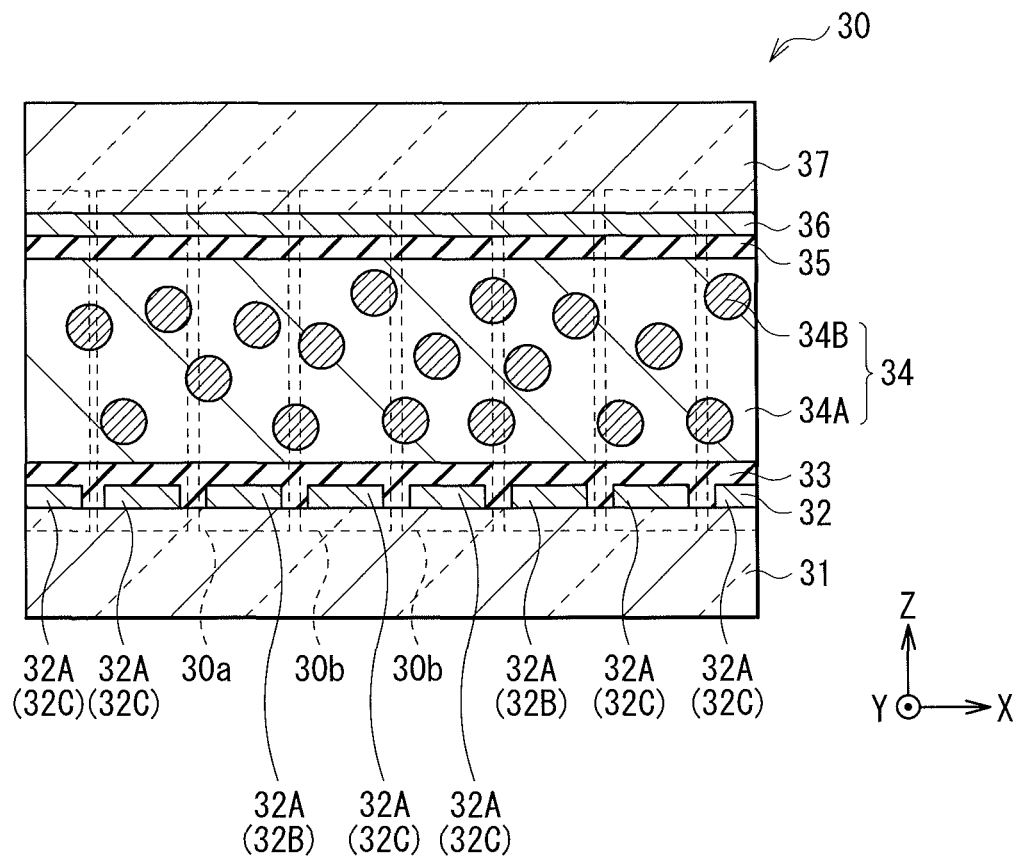
FIG. 5 is a sectional view illustrating an example of a configuration of a light modulation device in FIG. 3.

In the embodiment, the light modulation device 30 is disposed in the light guide plate 10. The light modulation device 30 is in close contact with the light guide plate 10 without an air layer in between, and is bonded to the light guide plate 10 with, for example, an adhesive (not illustrated) in between. For example, as illustrated in FIG. 5, the light modulation device 30 is configured by arranging a transparent substrate 31, a lower electrode 32, an alignment film 33, a light modulation layer 34, an alignment film 35, an upper electrode 36, and a transparent substrate 37 in order from a side closer to the reflective plate 40.

The transparent substrates 31 and 37 support the light modulation layer 34, and are typically configured of substrates transparent to visible light, for example, glass plates or plastic films. The lower electrode 32 and the upper electrode 36 generate an electric field in the light modulation layer 34 when a voltage is applied to them. The lower electrode 32 is disposed closer to the transparent substrate 31 in relation to the light modulation layer 34, and the upper electrode 36 is disposed closer to the transparent substrate 37 in relation to the light modulation layer 34. It is to be noted that the transparent substrate 31 or the transparent substrate 37 corresponds to a specific but not limitative example of "first transparent substrate" or "second transparent substrate". The lower electrode 32 corresponds to a specific but not limitative example of "first electrode", and the upper electrode 36 corresponds to a specific but not limitative example of "second electrode".

Figure 6:
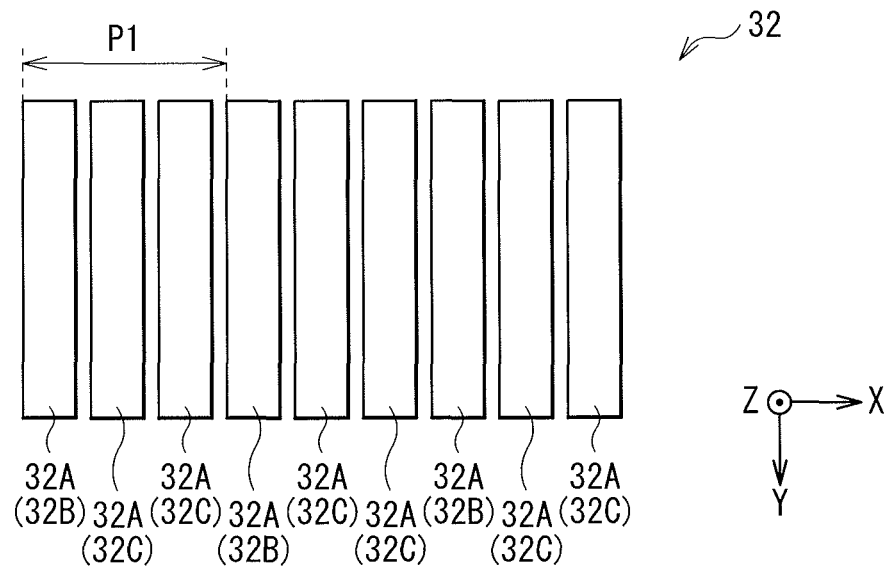
FIG. 6 is a plan view illustrating an example of a configuration of a lower electrode in FIG. 5.

For example, as illustrated in FIG. 6, the lower electrode 32 is configured of a plurality of sub-electrodes 32A. The plurality of sub-electrodes 32A each have a strip-like shape extending in one direction (a direction parallel to the light incident surface 10A) in a plane. A plurality of specific sub-electrodes 32A (hereinafter referred to as "sub-electrodes 32B") selected from the plurality of sub-electrodes 32A are used to generate linear illumination light beams when three-dimensional display is performed in the receiver-side unit 200. It is to be noted that the sub-electrodes 32B correspond to a specific but not limitative example of "second strip-like electrodes". Other sub-electrodes 32A (hereinafter referred to as "sub-electrodes 32C") except for the sub-electrodes 32B are used with the sub-electrodes 32B to generate planar illumination light, when two-dimensional display is performed in the receiver-side unit 200. In other words, when two-dimensional display is performed in the receiver-side unit 200, all sub-electrodes 32A are used to generate planar illumination light. It is to be noted that the sub-electrodes 32C correspond to a specific but not limitative example of "first strip-like electrodes".

A plurality of sub-electrode groups each configured of one sub-electrode 32B and two or more sub-electrodes 32C are arranged in an arrangement direction (a direction orthogonal to the light incident surface 10A). FIG. 6 illustrates the case where a plurality of sub-electrode groups each configured of one sub-electrode 32B and two sub-electrodes 32C are arranged in the arrangement direction as an example; however, the sub-electrode groups are not limited to those illustrated in FIG. 6. For example, the sub-electrode groups each may be configured of one sub-electrode 32B and one sub-electrode 32C, or one sub-electrode 32B and three or more sub-electrodes 32C. The width of each of the sub-electrodes 32B and 32C is preferably equal to the width of a sub-pixel of R, G, or B of the display panel 210 or an integral multiple of the width of the sub-pixel in terms of moire reduction.

The above-described sub-electrode groups are arranged with a pitch P1 (a pitch equal to or close to a pixel pitch when three-dimensional display is performed) corresponding to the pixel pitch when three-dimensional display is performed in the receiver-side unit 200. Moreover, the plurality of sub-electrodes 32B are also arranged with the pitch P1 (the pitch equal to or close to the pixel pitch when three-dimensional display is performed) corresponding to the pixel pitch when three-dimensional display is performed in the receiver-side unit 200 in a similar manner.

Figure 7:
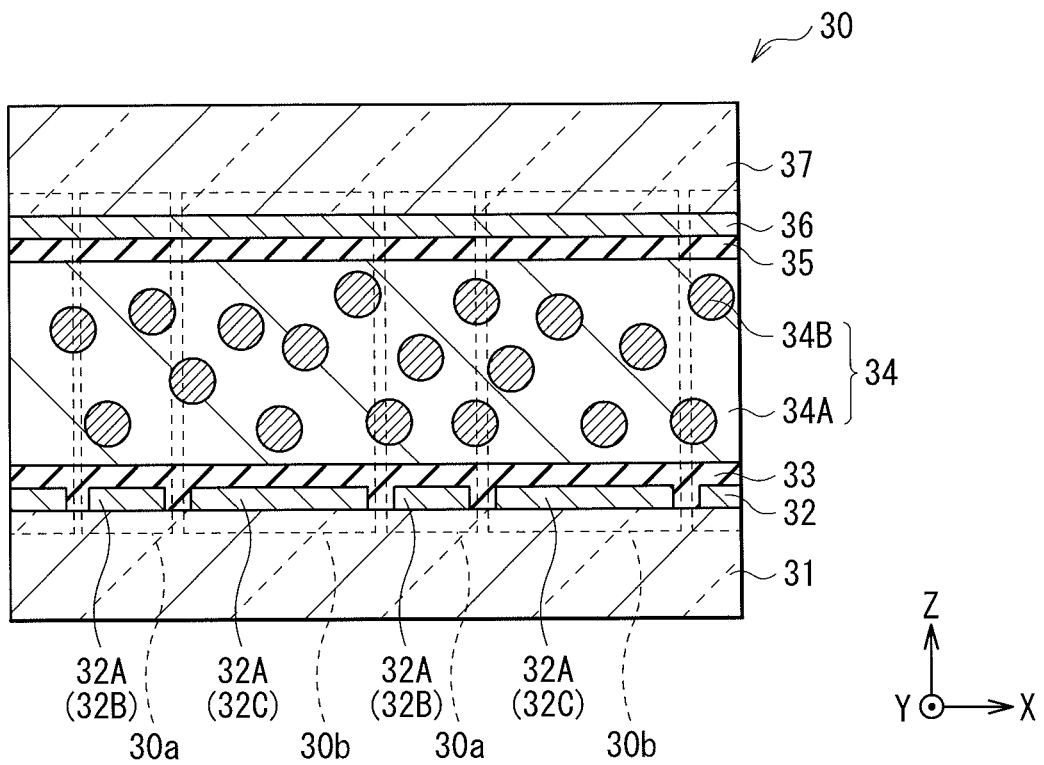
FIG. 7 is a sectional view illustrating another example of the configuration of the light modulation device in FIG. 3.
Figure 8:
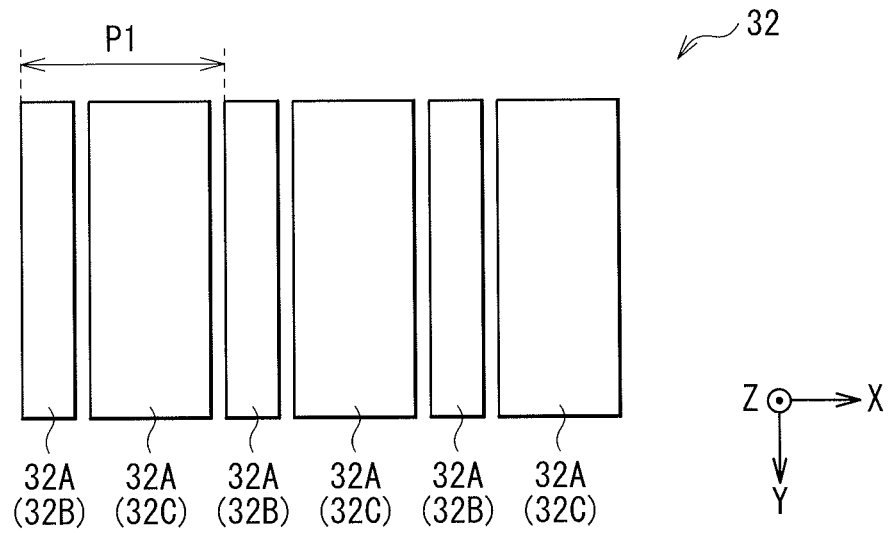
FIG. 8 is a plan view illustrating an example of a configuration of a lower electrode in FIG. 7.

It is to be noted that, in the case where the sub-electrode groups each are configured of one sub-electrode 32B and two or more sub-electrodes 32C, the width of the sub-electrode 32C is preferably equal to the width of the sub-electrode 32B. Moreover, in the case where the sub-electrode groups each are configured of one sub-electrode 32B and one sub-electrode 32C, for example, as illustrated in FIGS. 7 and 8, the width of the sub-electrode 32C may be larger than that of the sub-electrode 32B, or the width of the sub-electrode 32C may be equal to that of the sub-electrode 32B, though not illustrated.

Figure 9:
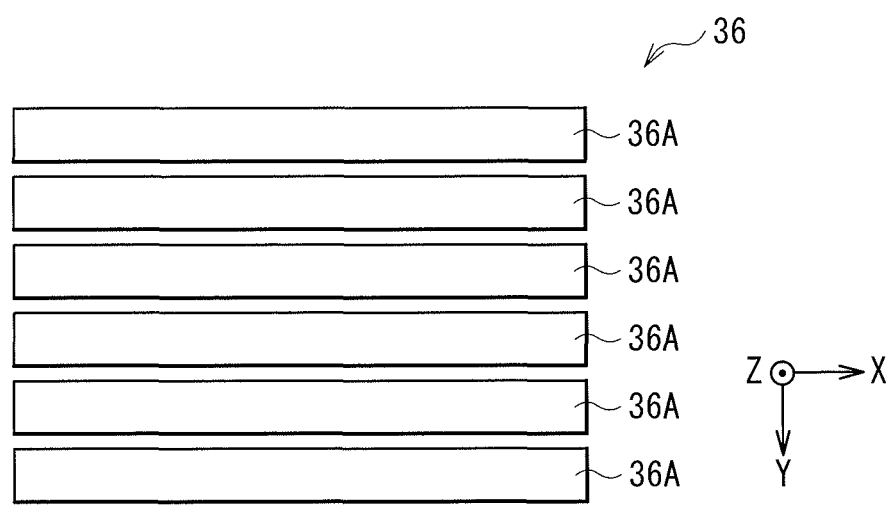
FIG. 9 is a plan view illustrating an example of a configuration of an upper electrode in FIGS. 5 and 7.

For example, as illustrated in FIG. 9, the upper electrode 36 is configured of a plurality of sub-electrodes 36A. The plurality of sub-electrodes 36A each have a strip-like shape extending in a direction intersecting with (or orthogonal to) the sub-electrodes 32A.

The lower electrode 32 and the upper electrode 36 each are configured of a transparent conductive film (for example, an ITO film). It is to be noted that the lower electrode 32 and the upper electrode 36 may be made of indium zinc oxide (IZO), a metal nanowire, a carbon nanotube, graphene, or the like.

Portions in positions, where the lower electrode 32 and the upper electrode 36 face each other when the lower electrode 32 and the upper electrode 36 are viewed from a direction of a normal to the light modulation device 30, of the light modulation device 30 configure light modulation cells 30a and 30b (refer to FIG. 5). The light modulation cell 30a corresponds to a portion in a position, where the sub-electrode 32B and the sub-electrode 36A face each other, of the light modulation device 30, and the light modulation cell 30b corresponds to a portion in a position, where the sub-electrode 32C and the sub-electrode 36A face each other, of the light modulation device 30. The light modulation cell 30a and the light modulation cell 30b are located adjacent to each other.

The light modulation cells 30a and 30b are separately and independently driven by applying predetermined voltages to the sub-electrode 32A and the sub-electrode 36A, and exhibit transparency (optical transparency) or a scattering property with respect to light from the light source 20, depending on magnitude of a potential difference applied to the sub-electrode 32A and the sub-electrode 36A. It is to be noted that transparency and the scattering property will be described in more detail when the light modulation layer 34 is described.

The alignment films 33 and 35 align, for example, a liquid crystal or a monomer used in the light modulation layer 34. Kinds of alignment films include a vertical alignment film and a horizontal alignment film, and in the embodiment, horizontal alignment films are used as the alignment films 33 and 35. Examples of the horizontal alignment films include an alignment film formed by performing a rubbing process on polyimide, polyamide imide, polyvinyl alcohol, or the like, and an alignment film provided with a groove by transfer or etching. Other examples of the horizontal alignment films include an alignment film formed by obliquely evaporating an inorganic material such as silicon oxide, a diamond-like carbon alignment film formed by ion beam irradiation, and an alignment film provided with an electrode pattern slit.

Moreover, it is only necessary for both of vertical and horizontal alignment films to have a function of aligning a liquid crystal and a monomer, and reliability, which is necessary for a typical liquid crystal display unit, with respect to repeated voltage application is not necessary, since reliability with respect to voltage application after forming a device is determined by an interface between a resultant formed by polymerizing a monomer, and a liquid crystal. Moreover, even if the alignment film is not used, for example, when an electric field or a magnetic field is applied between the lower electrode 32 and the upper electrode 36, a liquid crystal or a monomer used in the light modulation layer 34 is aligned. In other words, while an electric field or a magnetic field is applied between the lower electrode 32 and the upper electrode 36, the alignment state of the liquid crystal or the monomer under voltage application is fixed by ultraviolet irradiation. In the case where a voltage is used to form the alignment film, an electrode for alignment and an electrode for drive may be separately formed, or a dual-frequency liquid crystal allowing the sign of dielectric constant anisotropy to be inverted by a frequency may be used as a liquid crystal material. Moreover, in the case where a magnetic field is used to form the alignment film, for the alignment film, a material with large magnetic susceptibility anisotropy is preferably used, and, for example, a material with a large number of benzene rings is preferably used.

The light modulation layer 34 exhibits a scattering property or transparency with respect to light from the light source 20, depending on magnitude of an electric field. The light modulation layer 34 exhibits transparency with respect to light from the light source 20 when an electric field is relatively small, and exhibits the scattering property with respect to light from the light source 20 when the electric field is relatively large. For example, as illustrated in FIG. 5, the light modulation layer 34 is a composite layer including a bulk 34A and a plurality of microparticles 34B dispersed in the bulk 34A. The bulk 34A and the microparticles 34B have optical anisotropy.

Figure 10A:
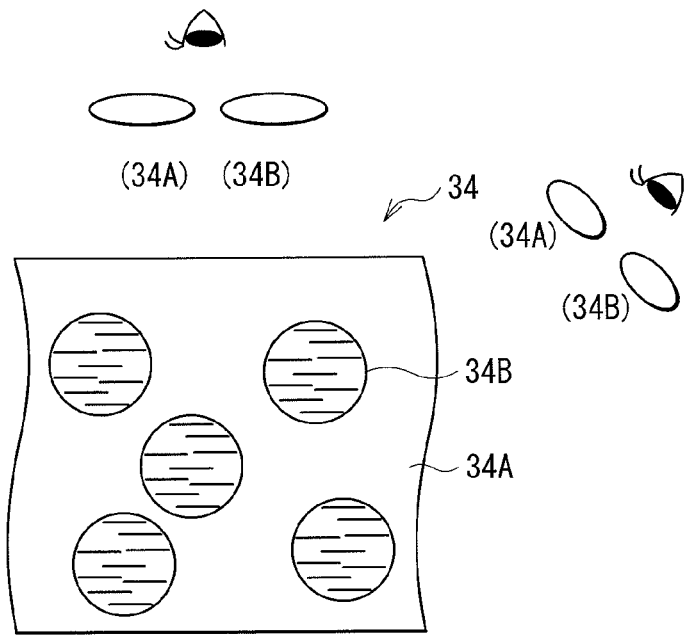
FIGS. 10A to 10C are schematic views for describing an example of a function of a light modulation layer in FIGS. 5 and 7 when the light modulation layer is in a normally black mode and in a horizontal alignment mode.

FIG. 10A schematically illustrates an example of an alignment state in the microparticles 34B in the case where a potential difference is not applied between the lower electrode 32 and the upper electrode 36 (hereinafter simply referred to as "under no potential difference application"). It is to be noted that, in FIG. 10A, an alignment state in the bulk 34A is not illustrated. In this description, "under no potential difference application" is a concept including "when a potential difference which is lower than a potential difference allowing the light modulation layer 34 to exhibit the scattering property and allows the light modulation layer 34 to exhibit transparency is applied".

Figure 10B:
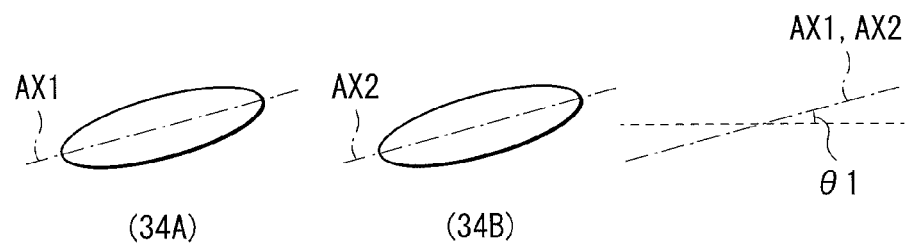
Figure 10C:
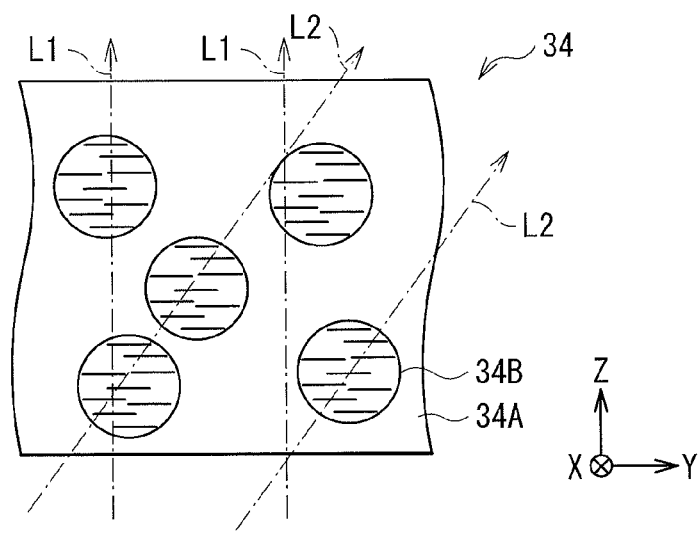

FIG. 10B illustrates an example of refractive index ellipsoids exhibiting refractive index anisotropy of the bulk 34A and the microparticle 34B under no potential difference application. The refractive index ellipsoid is a tensor ellipsoid representing a refractive index of linearly polarized light incident from various directions, and when a section of an ellipsoid from a light incident direction is observed, the refractive index is geometrically learned. FIG. 10C schematically illustrates an example of a state where light L1 toward a front direction and light L2 toward an oblique direction pass through the light modulation layer 34 under no potential difference application.

Figure 11A:
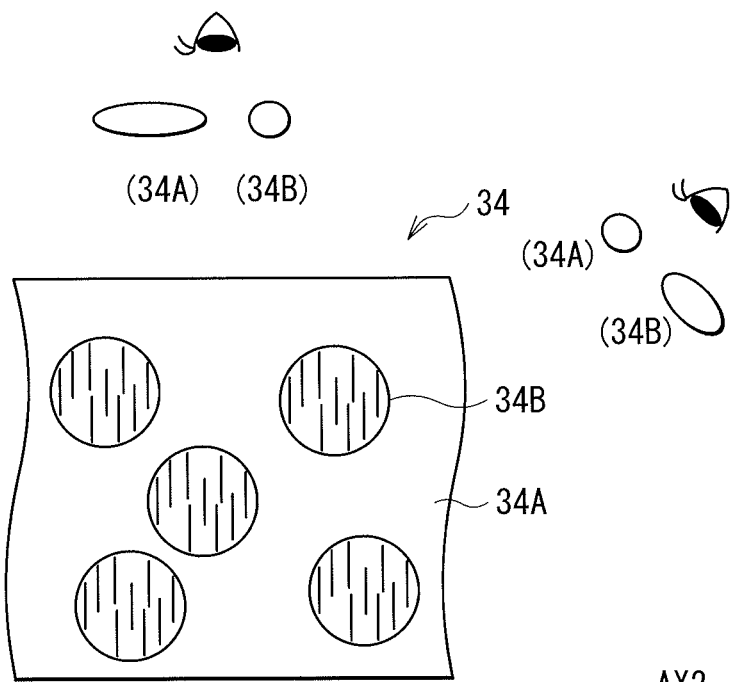
FIGS. 11A to 11C are schematic views for describing another example of the function of the light modulation layer in FIGS. 5 and 7 when the light modulation layer is in the normally black mode and in the horizontal alignment mode.

FIG. 11A schematically illustrates an example of an alignment state in the microparticles 34B in the case where a potential difference is applied between the lower electrode 32 and the upper electrode 36 (hereinafter simply referred to as "under potential difference application"). It is to be noted that, in FIG. 11A, an alignment state in the bulk 34A is not illustrated. In this description, "under potential difference application" means "when a potential difference allowing the light modulation layer 34 to exhibit the scattering property is applied".

Figure 11B:
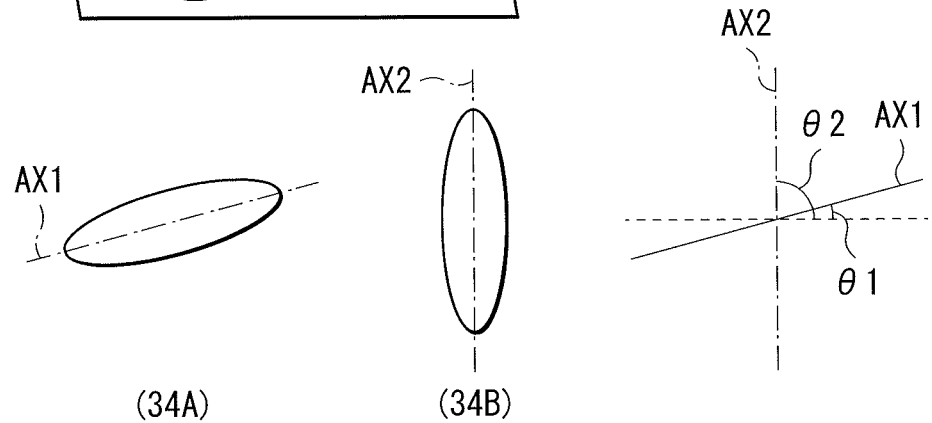
Figure 11C:
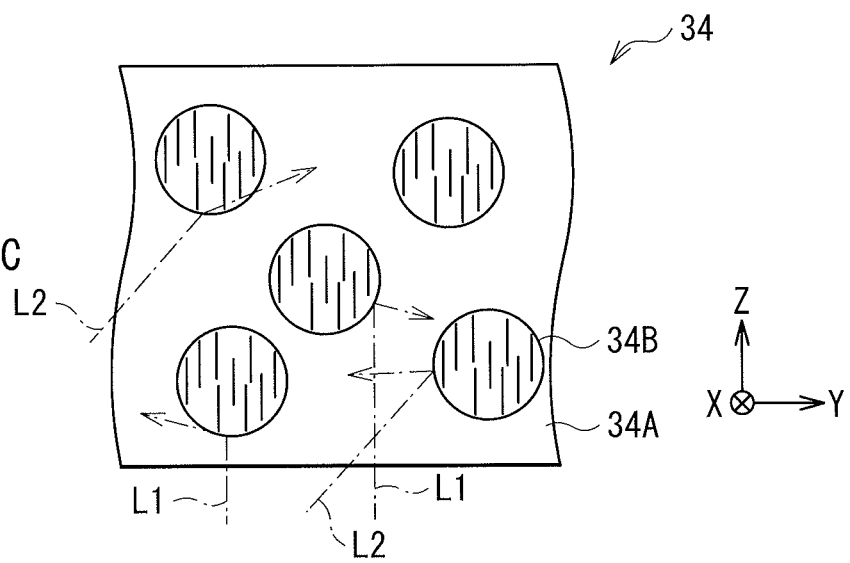

FIG. 11B illustrates an example of refractive index ellipsoids exhibiting refractive index anisotropy of the bulk 34A and the microparticle 34B under potential difference application. FIG. 11C schematically illustrates an example of a state where the light L1 toward the front direction and the light L2 toward the oblique direction are scattered by the light modulation layer 34 under potential difference application.

For example, as illustrated in FIGS. 10A and 10B, the bulk 34A and the microparticle 34B are structured to allow the direction of an optical axis AX1 of the bulk 34A and the direction of an optical axis AX2 of the microparticle 34B to coincide with (be parallel to) each other under no potential difference application. It is to be noted that the optical axes AX1 and AX2 each indicate a line parallel to a travel direction of a light beam allowing a refractive index to have one value irrespective of polarization direction. Moreover, it is not necessary for the directions of the optical axis AX1 and the optical axis AX2 to consistently coincide with each other, and the directions of the optical axis AX1 and the optical axis AX2 may be slightly deviated from each other due to, for example, a manufacturing error.

Moreover, for example, the microparticle 34B is structured to allow the optical axis AX2 thereof to be parallel to the light incident surface 10A of the light guide plate 10 under no potential difference application. For example, the microparticle 34B is further structured to allow the optical axis AX2 thereof to intersect with surfaces of the transparent substrates 31 and 37 at a slight angle θ1 (refer to FIG. 10B) under no potential difference application. It is to be noted that the angle θ1 will be described in more detail when a material forming the microparticle 34B is described.

On the other hand, for example, the bulk 34A is structured to have a fixed optical axis AX1 irrespective of whether or not a potential difference is applied between the lower electrode 32 and the upper electrode 36. More specifically, for example, as illustrated in FIGS. 10A, 10B, 11A, and 11B, the bulk 34A is structured to have the optical axis AX1 parallel to the light incident surface 10A of the light guide plate 10 as well as intersecting with the surfaces of the transparent substrates 31 and 37 at the predetermined angle θ1. In other words, under no potential difference application, the optical axis AX1 of the bulk 34A is parallel to the optical axis AX2 of the microparticle 34B.

It is to be noted that it is not necessary for the optical axis AX2 to be consistently parallel to the light incident surface 10A as well as to consistently intersect with the surfaces of the transparent substrates 31 and 37 at the angle θ1, and the optical axis AX2 may intersect with the surfaces of the transparent substrates 31 and 37 at an angle slightly different from the angle θ1 due to, for example, a manufacturing error. Moreover, it is not necessary for the optical axes AX1 and AX2 to be consistently parallel to the light incident surface 10A, and the optical axes AX1 and AX2 may intersect with the light incident surface 10A at a small angle due to, for example, a manufacturing error.

Figure 12:
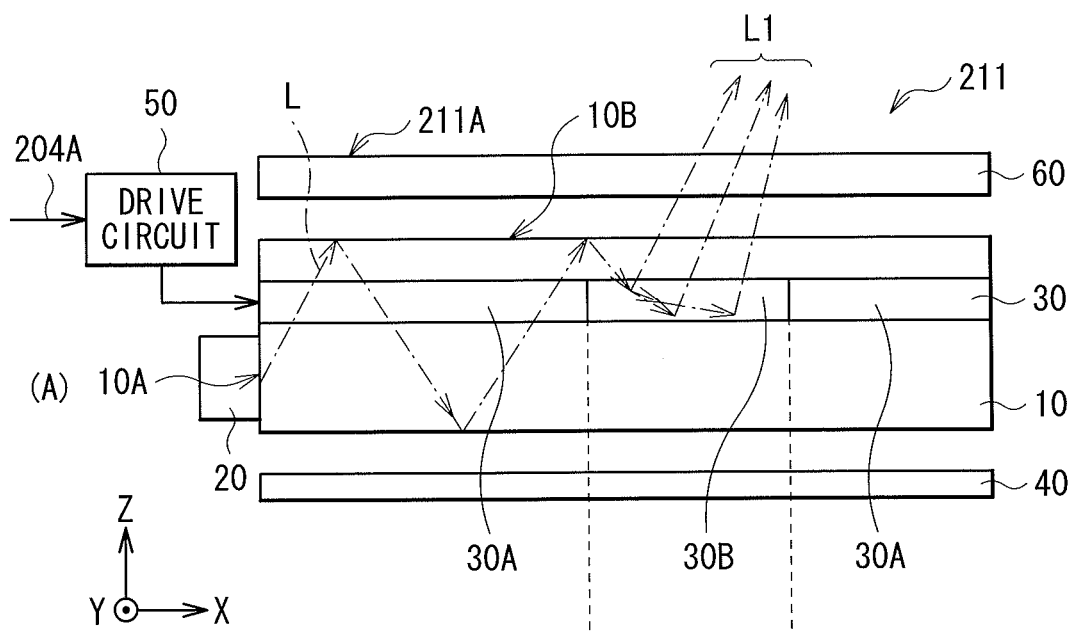
FIG. 12 is a schematic view for describing an example of a function of a backlight in FIG. 3.
Figure 12:
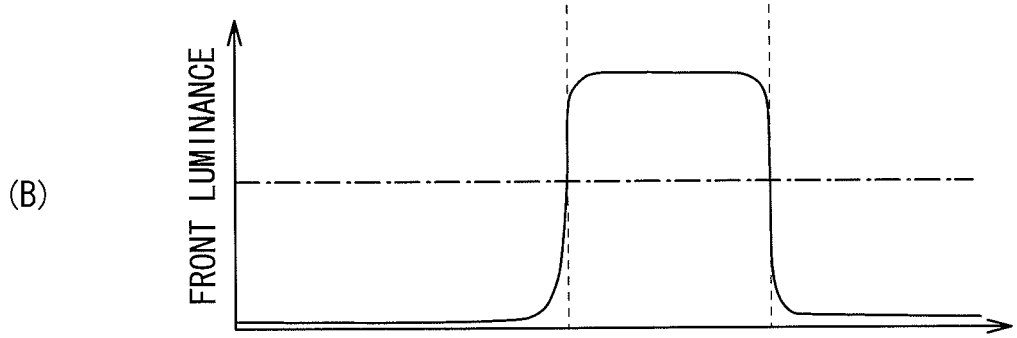

In this case, ordinary refractive indices of the bulk 34A and the microparticle 34B are preferably equal to each other, and extraordinary refractive indices of the bulk 34A and the microparticle 34B are preferably equal to each other. In this case, for example, under no potential difference application, as illustrated in FIG. 10A, there is little difference in refractive index in all directions including the front direction and the oblique direction, and high transparency (optical transparency) is obtained. Therefore, for example, as illustrated in FIG. 10C, the light L1 toward the front direction and the light L2 toward the oblique direction pass through the light modulation layer 34 without being scattered in the light modulation layer 34. As a result, for example, as illustrated in parts (A) and (B) in FIG. 12, light L from the light source 20 (light from an oblique direction) is totally reflected by upper and lower interfaces of a transparent region (a transparent region 30A) of the light modulation layer 34 in the light guide plate 10, and luminance in the transparent region 30A (luminance in a black state of display) is decreased, compared to the case where light is uniformly emitted from an entire surface of the backlight 211 (indicated by an alternate long and short dash line in the part (B) in FIG. 12). It is to be noted that a profile of front luminance in the part (B) in FIG. 12 is obtained by arranging a diffusion sheet 60 on the light guide plate 10, and measuring the front luminance through the diffusion sheet 60.

It is to be noted that the top surface of the light guide plate 10 as one interface of the transparent region 30A is in contact with a gap between the display panel 210 and the light guide plate 10; however, the gap is preferably filled with a material with a lower refractive index than that of the top surface of the light guide plate 10. A layer made of such a low-refractive-index material is typically air, and may be a glue or an adhesive made of a low-refractive-index material.

For example, under potential difference application, as illustrated in FIGS. 11A and 11B, the bulk 34A and the microparticle 34B are structured to allow the directions of the optical axis AX1 and the optical axis AX2 to be different from (intersect with or be substantially orthogonal to) each other. Moreover, for example, under potential difference application, the microparticle 34B is structured to allow the optical axis AX2 thereof to be parallel to the light incident surface 10A of the light guide plate 10 as well as to intersect with the surfaces of the transparent substrates 31 and 37 at an angle θ2 (for example, 90°) larger than the angle θ1. It is to be noted that the angle θ2 will be described in more detail when the material forming the microparticles 34B is described.

Therefore, under potential difference application, in the light modulation layer 34, a difference in refractive index in all directions including the front direction and the oblique direction is increased to obtain a high scattering property. For example, as illustrated in FIG. 11C, the light L1 toward the front direction and the light L2 toward the oblique direction are thereby scattered in the light modulation layer 34. As a result, for example, as illustrated in the part (A) in FIG. 12, the light L from the light source 20 (light from the oblique direction) passes through upper and lower interfaces of a region exhibiting the scattering property (a scattering region 30B) in the light modulation layer 34 of the light guide plate 10, and light having passed toward the reflective plate 40 is reflected by the reflective plate 40 to pass through the light modulation device 30. Therefore, the luminance of the scattering region 30B is extremely higher than that in the case where light is uniformly emitted from the entire surface of the backlight 211

(indicated by the alternate long and short dash line in the part (B) in FIG. 12), and luminance in white display is partially increased (partial luminance enhancement) by a reduced amount of the luminance of the transparent region 30A.

It is to be noted that the ordinary refractive indices of the bulk 34A and the microparticle 34B may be slightly different from each other due to, for example, a manufacturing error, and are preferably, for example, 0.1 or less, and more preferably 0.05 or less. Moreover, the extraordinary refractive indices of the bulk 34A and the microparticle 34B may be slightly different from each other due to, for example, a manufacturing error, and are preferably, for example, 0.1 or less, and more preferably 0.05 or less.

Moreover, a refractive index difference in the bulk 34A ($\Delta n_P$=extraordinary refractive index $ne_P$–ordinary refractive index $no_P$) and a refractive index difference in the microparticle 34B ($\Delta n_L$=extraordinary refractive index $ne_L$–ordinary refractive index $no_L$) are preferably as large as possible, and are preferably 0.05 or over, more preferably 0.1 or over, and still more preferably 0.15 or over. In the case where the refractive index differences in the bulk 34A and the microparticle 34B are large, the scattering power of the light modulation layer 34 is enhanced to allow light guide conditions to be easily disrupted, thereby allowing light from the light guide plate 10 to be easily extracted.

Further, the bulk 34A and the microparticle 34B have different response speeds with respect to an electric field. The bulk 34A has, for example, a streaky structure, a porous structure, or a rod-like structure having a response speed slower than that of the microparticle 34B. The bulk 34A is formed of, for example, a polymer material obtained by polymerizing a low-molecular monomer. The bulk 34A is formed, for example, by polymerizing, by one or both of heat and light, a material (for example, a monomer) with orientation and polymerization which is aligned along the alignment direction of the microparticles 34B or the alignment directions of the alignment films 33 and 35.

For example, the streaky structure, the porous structure, or the rod-like structure of the bulk 34A has a long axis in a direction parallel to the light incident surface 10A of the light guide plate 10 as well as intersecting with the surfaces of the transparent substrates 31 and 37 at the slight angle $\theta 1$. In the case where the bulk 34A has the streaky structure, an average streaky texture size in a short-axis direction is preferably within a range of 0.1 µm to 10 µm both inclusive to enhance a scattering property with respect to guided light, and more preferably within a range of 0.2 µm to 2.0 µm both inclusive. In the case where the average streaky texture size in the short-axis direction is within a range of 0.1 µm to 10 µm both inclusive, scattering power in the light modulation device 30 is substantially equal in a visible region of 380 to 780 nm. Only light of a specific wavelength component is not thereby increased or decreased in a plane; therefore, a balance in a visible region is achievable in the plane. In the case where the average streaky texture size in the short-axis direction is smaller than 0.1 µm or exceeds 10 µm, the scattering power of the light modulation device 30 is low irrespective of wavelength, and it is difficult for the light modulation device 30 to function as a light modulation device.

Moreover, to reduce wavelength dependence of scattering, the average streaky texture size in the short-axis direction is preferably within a range of 0.5 µm to 5 µm both inclusive, and more preferably within a range of 1 µm to 3 µm. In such a case, in a process of propagating light emitted from the light source 20 through the light guide plate 10, when the light repeatedly passes through the bulk 34A in the light modulation device 30, wavelength dependence of scattering in the bulk 34A is suppressed. The streaky texture size is observed by a polarizing microscope, a confocal microscope, an electron microscope, or the like.

On the other hand, the microparticles 34B mainly include, for example, a liquid crystal material, and have a response speed sufficiently higher than that of the bulk 34A. Examples of the liquid crystal material (liquid crystal molecules) included in the microparticles 34B include rod-like molecules. As liquid crystal molecules included in the microparticles 34B, liquid crystal molecules having positive dielectric constant anisotropy (a so-called positive type liquid crystal) are preferably used.

In this case, under no potential difference application, the long-axis directions of the liquid crystal molecules in the microparticles 34B are parallel to the optical axis AX1. At this time, the long axes of the liquid crystal molecules in the microparticles 34B are parallel to the light incident surface 10A of the light guide plate 10, as well as intersect with the surfaces of the transparent substrates 31 and 37 at the slight angle $\theta 1$. In other words, under no potential difference application, the liquid crystal molecules in the microparticles 34B are aligned to be tilted at the angle $\theta 1$ in a plane parallel to the light incident surface 10A of the light guide plate 10. The angle $\theta 1$ is called "pretilt angle", and is, for example, preferably within a range of 0.1° to 30° both inclusive. The angle $\theta 1$ is more preferably within a range of 0.5° to 10° both inclusive, and still more preferably within a range of 0.7° to 2° both inclusive. When the angle $\theta 1$ is increased, scattering efficiency tends to be reduced due to the following reason. Moreover, when the angle $\theta 1$ is too small, the angle of a direction where the liquid crystal rises under potential difference application varies. For example, the liquid crystal may rise in a 180°-different direction (reverse tilt). Therefore, refractive index differences in the microparticles 34B and the bulk 34A are not effectively used; therefore, scattering efficiency tends to be reduced, and luminance tends to be reduced.

Further, under potential difference application, in the microparticles 34B, the long-axis directions of the liquid crystal molecules intersect with or are orthogonal (or substantially orthogonal) to the optical axis AX1. At this time, the long axes of the liquid crystal molecules in the microparticles 34B are parallel to the light incident surface 10A of the light guide plate 10, as well as intersect with the surfaces of the transparent substrates 31 and 37 at the angle $\theta 2$ (for example, 90°) which is larger than the angle $\theta 1$. In other words, under potential difference application, the liquid crystal molecules in the microparticles 34B are aligned to be tilted at the angle $\theta 2$ in a plane parallel to the light incident surface 10A of the light guide plate 10 or to rise upright at the angle $\theta 2$ (=90°).

The above-described monomer with orientation and polymerization may be a material having optical anisotropy and forming a composite material with a liquid crystal; however, a low-molecular monomer which is cured with ultraviolet light is preferable in this embodiment. It is preferable that, under no potential difference application, directions of optical anisotropy of the liquid crystal and a resultant (a polymer material) formed by polymerizing a low-molecular monomer coincide with each other; therefore, before curing the low-molecular monomer with ultraviolet light, the liquid crystal and the low-molecular monomer are preferably aligned in the same direction. In the case where a liquid crystal is used as the microparticles 34B, when the liquid crystal includes rod-like molecules, the used monomer material preferably has a rod-like shape. As described above, a material having both of polymerization and liquid crystal properties is preferably used as the monomer material, and, for example, the monomer material preferably includes one or more functional groups selected from the group consisting of an acrylate group, a methacrylate group, an acryloyloxy group, a methacryloyloxy group, a vinyl ether group, and an epoxy group as polymerizable functional groups. These functional groups are polymerized by ultraviolet, infrared, or electron irradiation, or by heating. To suppress a reduction in the degree of alignment under ultraviolet irradiation, a liquid crystal material having a polyfunctional group may be added. In the case where the bulk 34A has the above-described streaky structure, as the raw material of the bulk 34A, a bifunctional liquid crystal monomer is preferably used. Moreover, a monofunctional monomer may be added to the raw material of the bulk 34A to adjust a temperature at which liquid crystal properties are exhibited, or a tri- or more-functional monomer may be added to the raw material of the bulk 34A to improve crosslink density.

As described above, under no potential difference application, the optical axis AX1 of the bulk 34A and the optical axis AX2 of the microparticle 34B each mainly have an optical-axis component in the same direction. Under no potential difference application, as illustrated in FIG. 13, the optical axes AX1 and AX2 are oriented in the same direction, for example, the rubbing direction of the alignment films 33 and 35. Moreover, for example, as illustrated in FIG. 13, under no potential difference application, the optical axes AX1 and AX2 are parallel or substantially parallel to the light incident surface 10A. Further, under no potential difference application, as illustrated in FIGS. 5 and 13, the optical axes AX1 and AX2 are parallel or substantially parallel to the transparent substrate 31. In other words, under no potential difference application, the optical axes AX1 and AX2 are oriented substantially in a Y-axis direction in FIG. 13.

Moreover, under no potential difference application, the optical axes AX1 and AX2 each mainly have an optical-axis component in a direction parallel to a transmission axis AX10 of the polarizing plate 210B located closer to the backlight 211. For example, as illustrated in FIG. 13, under no potential difference application, the optical axes AX1 and AX2 are oriented in a direction parallel to the transmission axis AX10. For example, as illustrated in FIG. 13, the transmission axis AX10 is oriented in the rubbing direction of the alignment films 33 and 35. It is to be noted that a transmission axis AX11 of the polarizing plate 210C located closer to the image display plane is orthogonal to the transmission axis AX10 of the polarizing plate 210B located closer to the backlight 211.

Figure 14:
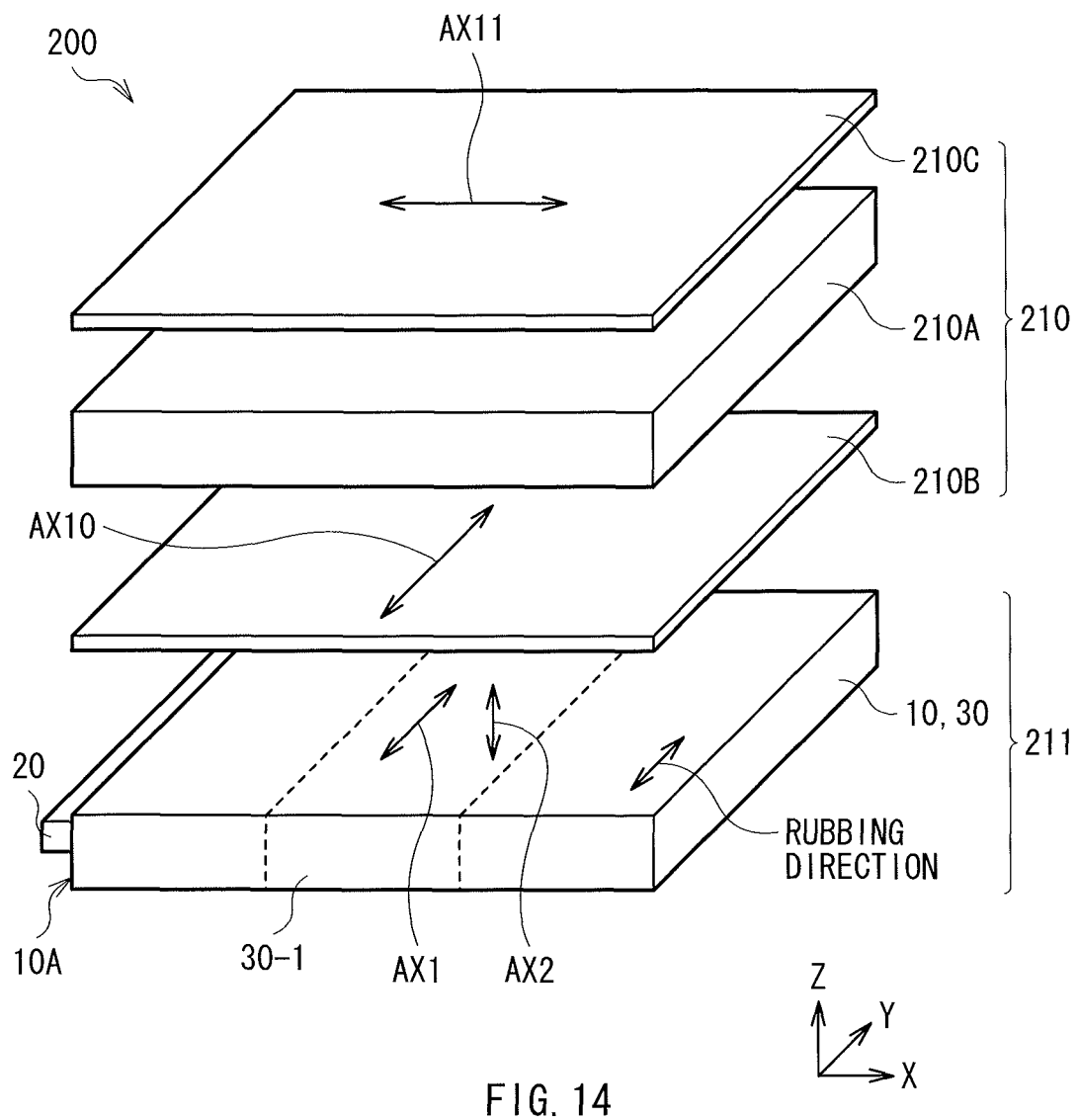
FIG. 14 is a perspective view illustrating another example of the relationship between the polarizing direction of illumination light and the polarizing axis of the lower polarizing plate of the display panel.

Further, as described above, under potential difference application, the optical axis AX1 is oriented in the same or substantially the same direction as that under no potential difference application. Under potential difference application, the optical axis AX1 mainly has an optical-axis component in a direction parallel to the transmission axis AX10 of the polarizing plate 210B, and, for example, as illustrated in FIG. 14, the optical axis AX1 is oriented in a direction parallel to the transmission axis AX10. Under potential difference application, for example, the optical axis AX1 is parallel or substantially parallel to the light incident surface 10A, and is also parallel or substantially parallel to the transparent substrate 31.

On the other hand, under potential difference application, the optical axis AX2 is displaced in a predetermined direction by an influence of an electric field generated by the potential difference applied to the lower electrode 32 and the upper electrode 36. For example, as illustrated in FIGS. 5 and 14, under potential difference application, the optical axis AX2 intersects with or is orthogonal (or substantially orthogonal) to the transparent substrate 31. In other words, the optical axis AX2 is displaced (that is, rises) in a direction where an angle between the optical axis AX2 and the normal to the transparent substrate 31 is reduced by potential difference application to the lower electrode 32 and the upper electrode 36. At this time, the optical axis AX2 is orthogonal or substantially orthogonal to the optical axis AX1, and is orthogonal or substantially orthogonal to the transparent substrate 31.

For example, the drive circuit 50 controls the magnitude of a potential difference applied to a pair of electrodes (the sub-electrode 32A and the sub-electrode 36A) of each of the light modulation cells 30a and 30b to allow the optical axes AX2 of the microparticles 34B in the light modulation cell 30b to be parallel or substantially parallel to the optical axis AX1 of the bulk 34A, as well as to allow the optical axes AX2 of the microparticles 34B in the light modulation cell 30a to intersect with or be orthogonal to the optical axis AX1 of the bulk 34A. Moreover, for example, the drive circuit 50 controls the magnitude of the potential difference applied to the pair of electrodes (the sub-electrode 32A and the sub-electrode 36A) of each of the light modulation cells 30a and 30b to allow the optical axes AX2 of the microparticles 34B in the light modulation cells 30a and 30b to intersect with or be orthogonal to the optical axis AX1 of the bulk 34A. In other words, the drive circuit 50 allows, by electric field control, the direction of the optical axis AX1 of the bulk 34A and the directions of the optical axes AX2 of the microparticles 34B to coincide with (or substantially coincide with) each other or to be different from (or orthogonal to) each other.

The drive circuit 50 allows the backlight 211 to emit a plurality of linear illumination light beams when a signal specifying three-dimensional display is supplied to the drive circuit 50 as the control signal 204A. More specifically, the drive circuit 50 applies a potential difference allowing the light modulation layer 34 to exhibit the scattering property to the light modulation cells 30a each including the sub-electrode 32B and applies a potential difference allowing the light modulation layer 34 to exhibit transparency to the light modulation cells 30b each including the sub-electrode 32C. In other words, the drive circuit 50 controls the magnitude of a potential difference applied to the pair of electrodes (the sub-electrode 32A and the sub-electrode 36A) of each of the light modulation cells 30a and 30b to allow the optical axes AX2 of the microparticles 34B in all of the light modulation cells 30a included in the backlight 211 to intersect with the optical axis AX1 of the bulk 34A, as well as to allow the optical axes AX2 of the microparticles 34B in all of the light modulation cells 30b included in the backlight 211 to be parallel to the optical axis AX1 of the bulk 34A. Thus, the drive circuit 50 allows each of the light modulation cells 30a to emit a linear illumination light beam, and allows each of the light modulation cells 30b not to emit illumination light (to hardly emit light).

The drive circuit 50 allows the backlight 211 to emit planar illumination light when a signal specifying two-dimensional display is supplied to the drive circuit 50 as the control signal 204A. More specifically, the drive circuit 50 applies a potential difference allowing the light modulation layer 34 to exhibit the scattering property to each of the light modulation cells 30a and 30b. In other words, the drive circuit 50 controls the magnitude of the potential difference applied to the pair of electrodes (the sub-electrode 32A and the sub-electrode 36A) of each of the light modulation cells 30a and 30b to allow the optical axes AX2 of the microparticles 34B in all of the light modulation cells 30a and 30b included in the backlight 211 to intersect with or be orthogonal (or substantially orthogonal) to the optical axis AX1 of the bulk 34A. Thus, the drive circuit 50 allows all of the light modulation cells 30a and 30b to emit illumination light, thereby emitting planar illumination light.

Figure 15:
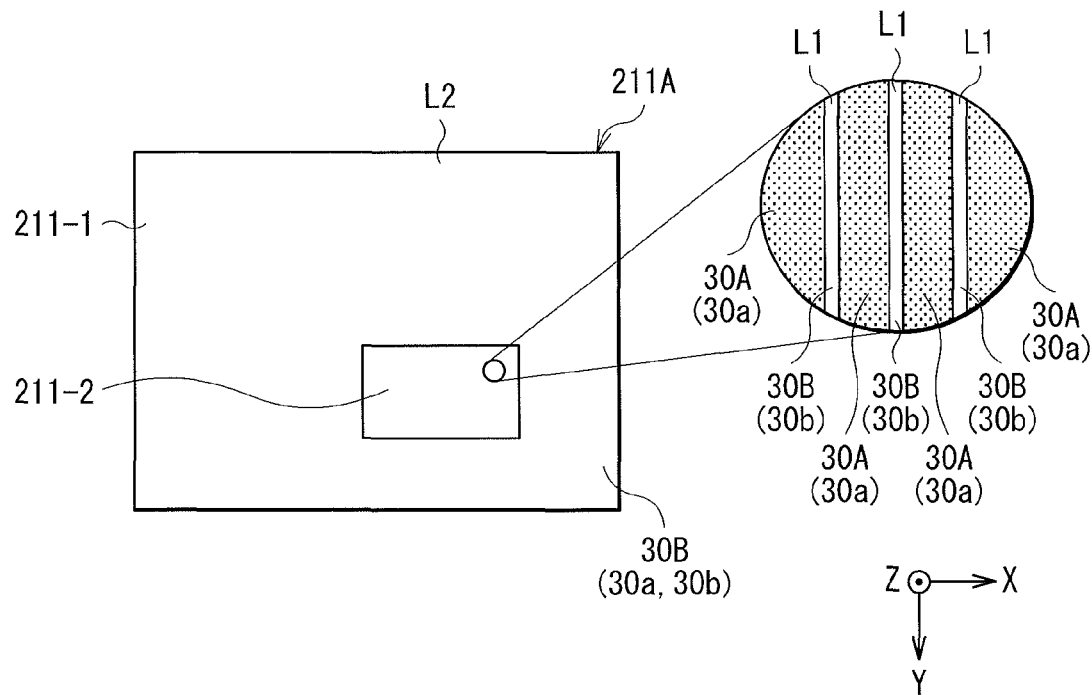
FIG. 15 is a plan view illustrating an example of a distribution of illumination light from the backlight.

When a signal specifying partial three-dimensional display is supplied to the drive circuit 50 as the control signal 204A together with region information of a three-dimensional display region, the drive circuit 50 applies a potential difference allowing the light modulation layer 34 to exhibit the scattering property to the light modulation cells 30a included in a region (a 3D display region 211-2) associated with the region information of the backlight 211, and applies a potential difference allowing the light modulation layer 34 to exhibit transparency to the light modulation cells 30b included in the 3D display region 211-2. Moreover, the drive circuit 50 applies a potential difference allowing the light modulation layer 34 to exhibit the scattering property to all light modulation cells 30a and 30b included in a region (a 2D display region 211-1) not associated with the region information of the backlight 211. Thus, for example, as illustrated in FIG. 15, the drive circuit 50 allows the 2D display region 211-1 to emit planar illumination light L2, and allows the 3D display region 211-2 to emit a plurality of linear illumination light beams L1. At this time, each of the linear illumination light beams L1 extends in a direction parallel to a direction where the sub-electrodes 32B extend, and, for example, as illustrated in FIG. 15, each of the linear illumination light beams L1 extends in the Y-axis direction (that is, a direction parallel to the light incident surface 10A). It is to be noted that the 3D display region 211-2 corresponds to a specific but not limitative example of "second region", and the 2D display region 211-1 corresponds to a specific but not limitative example of "first region".

Figure 16:
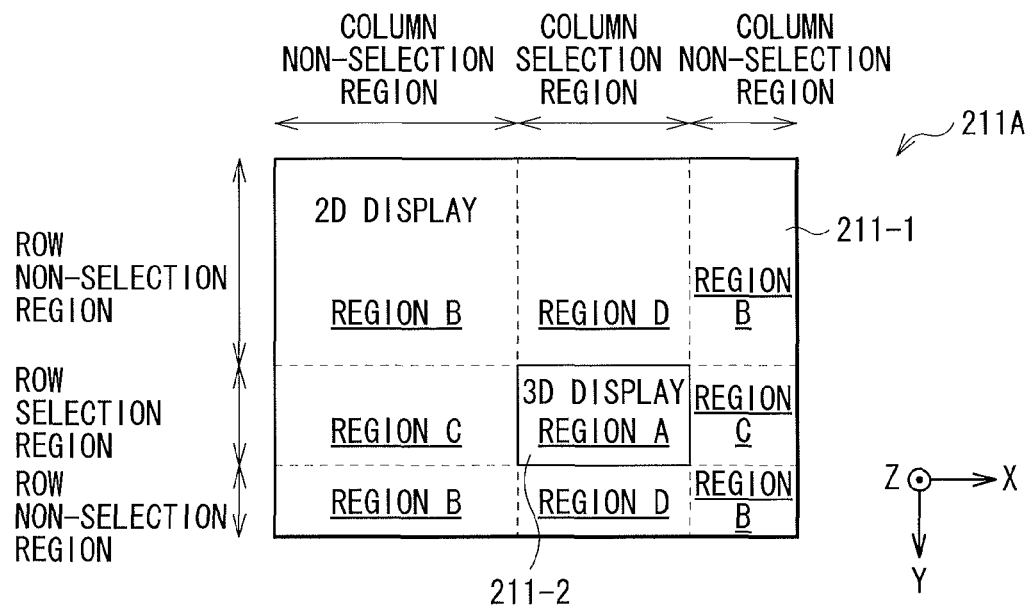
FIG. 16 is a diagram illustrating a state where a light emission surface of the backlight is partitioned into regions.

FIG. 16 illustrates a state where a light emission surface 211A of the backlight 211 is partitioned into regions. In FIG. 16, a region A is a region corresponding to the 3D display region 211-2. A region B is a region not located on both sides of and above and below the 3D display region 211-2. A region C is a region located on the right or the left of the 3D display region 211-2. A region D is a region located above or below the 3D display region 211-2.

In FIG. 16, a region including the region A and extending in a horizontal direction is a row selection region, and a region not including the region A and extending in the horizontal direction is a row non-selection region. Moreover, a region including the region A and extending in a vertical direction is a column selection region, and a region not including the region A and extending in the vertical direction is a column non-selection region. Therefore, a region where the row selection region and the column selection region intersect with each other is the region A, and a region where the row non-selection region and the column non-selection region intersect with each other is the region B. Moreover, a region where the row selection region and the column non-selection region intersect with each other is the region C, and a region where the row non-selection region and the column selection region intersect with each other is the region D.

Figure 17:
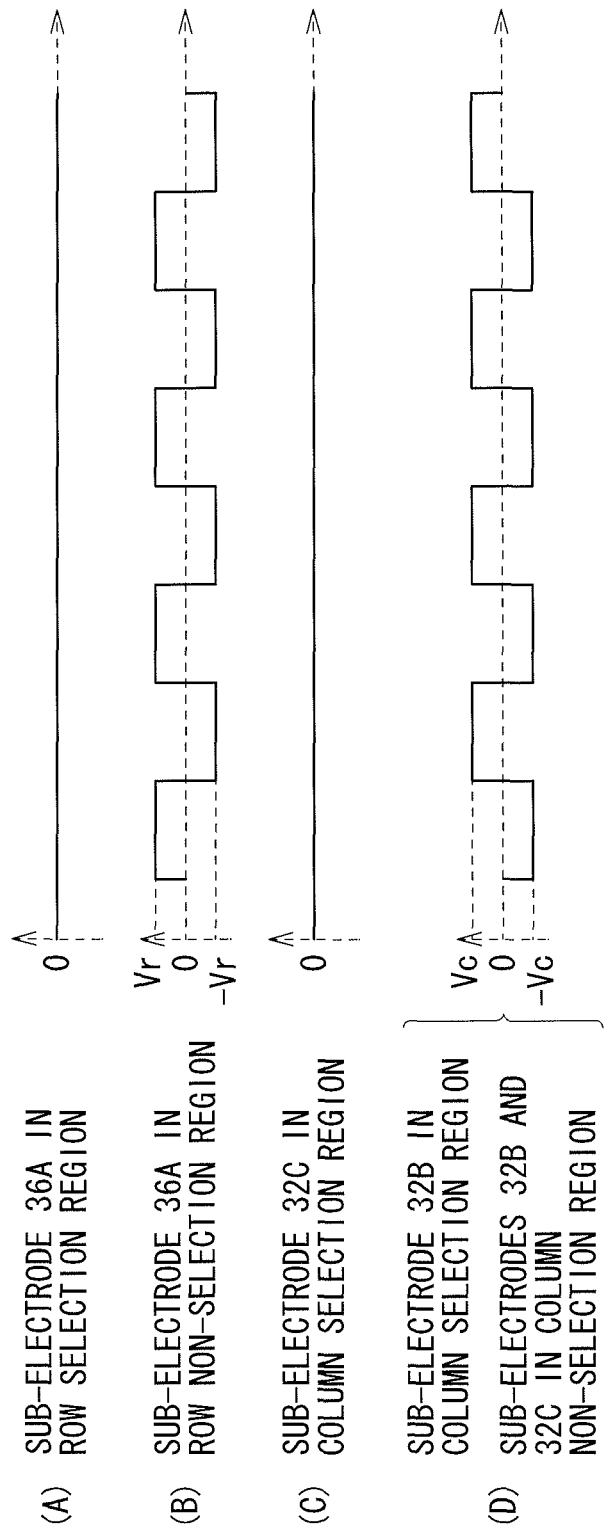
FIG. 17 is a waveform chart illustrating an example of a drive signal applied to the backlight.

FIG. 17 illustrates an example of various voltage waveforms applied to the sub-electrodes 32B, 32C, and 36A. The voltage waveforms in FIG. 17 is based on the premise that the light modulation layer 34 is in a normally black mode in which the light modulation layer 34 is switched into a scattering state under voltage application and is switched into a transmission state under no voltage application. It is to be noted that, in the embodiment, the light modulation layer 34 is in a horizontal alignment mode; however, even if the light modulation layer 34 is in a vertical alignment mode which will be described later, the voltage waveforms in FIG. 17 is applicable to the sub-electrodes 32B, 32C, and 36A.

The drive circuit 50 drives each of the sub-electrodes 32B, 32C, and 36A to allow an in-plane distribution of a potential difference between the sub-electrodes 32B or the sub-electrodes 32C and the sub-electrodes 36A to be constant within one frame period when a two-dimensional image, a three-dimensional image, or an image including a two-dimensional image and a three-dimensional image is displayed on the display panel 210. More specifically, as illustrated in parts (A) and (C) in FIG. 17, the drive circuit 50 applies a fixed potential (for example, a ground potential) to the sub-electrodes 36A in the row selection region and the sub-electrodes 32B in the column selection region. Moreover, as illustrated in parts (B) and (D) in FIG. 17, the drive circuit 50 applies AC potentials with phases in synchronization with each other to the sub-electrodes 36A in the row non-selection region, the sub-electrodes 32B in the column selection region, and the sub-electrodes 32B and 32C in the column non-selection region. The drive circuit 50 applies an AC potential with an amplitude Vr (RMS) to the sub-electrodes 36A in the row non-selection region, and applies an AC potential with an amplitude Vc (RMS) to the sub-electrodes 32B in the column selection region and the sub-electrodes 32B and 32C in the column non-selection region. The amplitude Vr and the amplitude Vc are preferably equal to each other, but may be different from each other.

Figure 18:
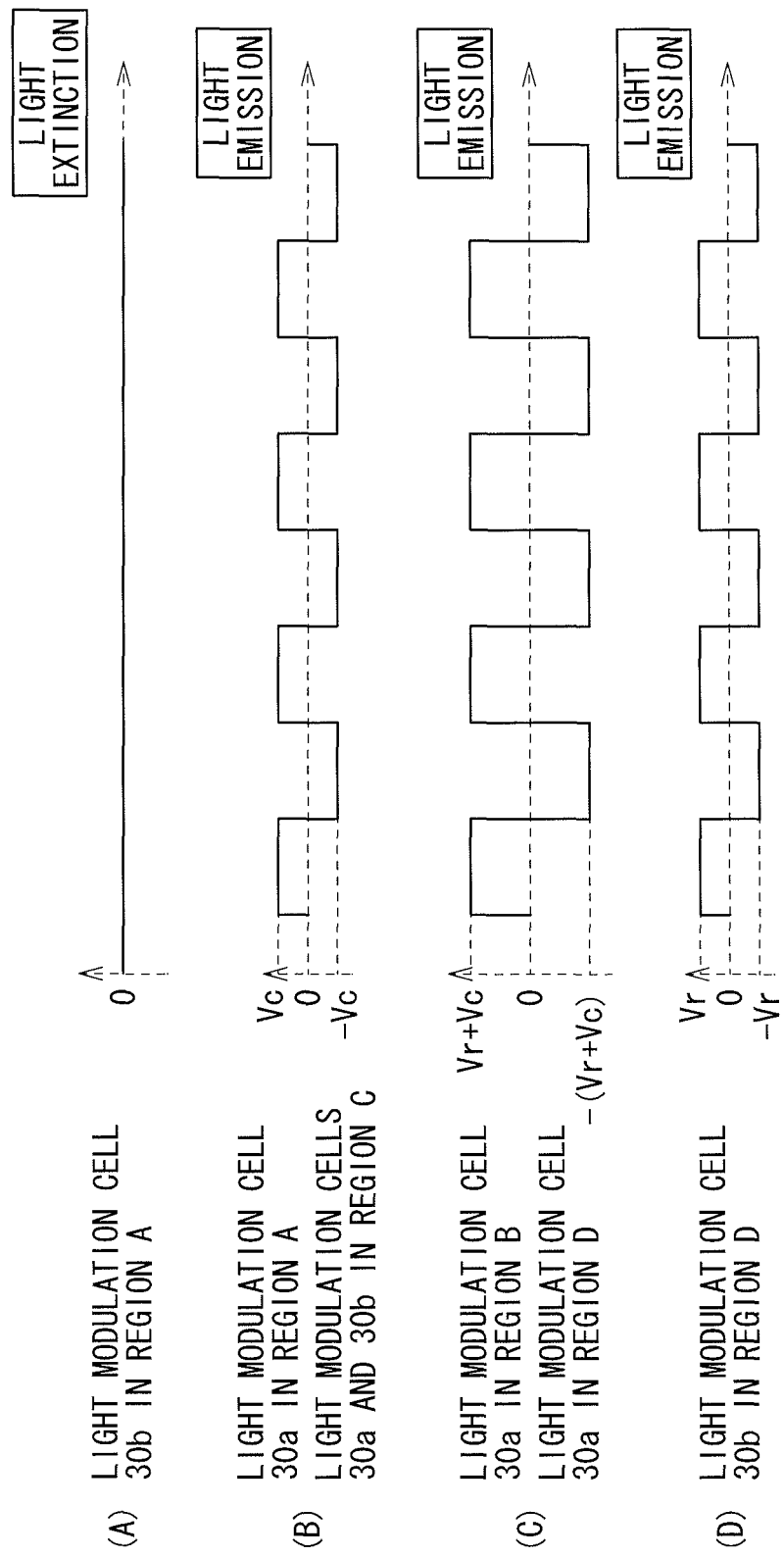
FIG. 18 is a waveform chart illustrating an example of a potential difference applied to a light modulation cell when the backlight is driven by the drive signal illustrated in FIG. 17.
Figure 19:
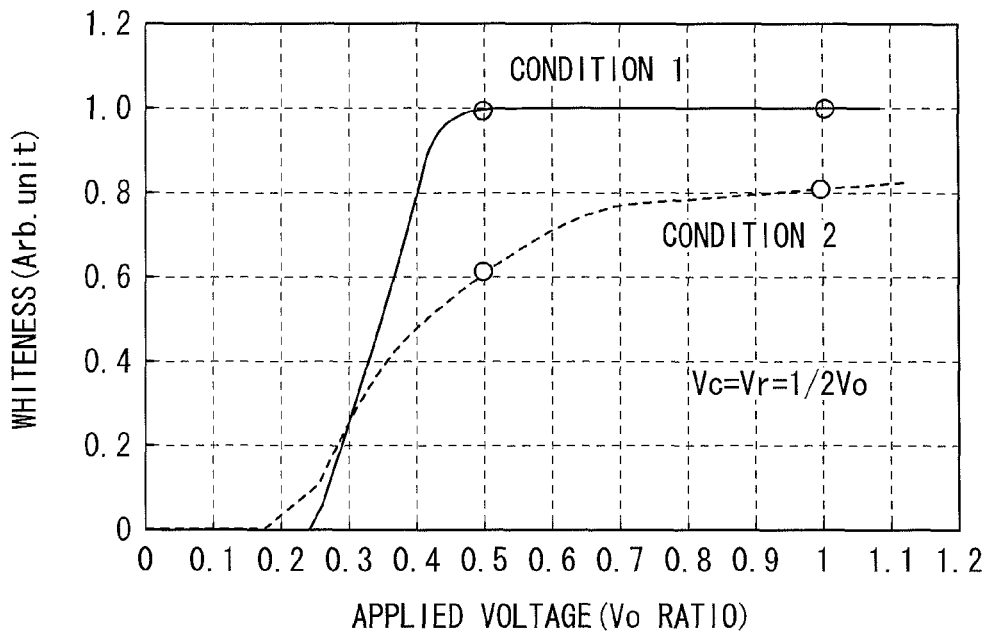
FIG. 19 is a relationship diagram illustrating an example of a relationship between a voltage (an applied voltage) applied to a light modulation cell and whiteness of illumination light emitted from the light modulation cell.

FIG. 18 illustrates an example of variations in potentials of the light modulation devices 30a and 30b with time when voltages illustrated in FIG. 17 are applied to the sub-electrodes 32B, 32C, and 36A. As illustrated in parts (A) to (D) in FIG. 18, the fixed potential (for example, the ground potential) is applied to only the light modulation cells 30b in the region A, and an AC potential with the amplitude Vr, the amplitude Vc, or an amplitude (Vr+Vc=Vo) (RMS) is applied to the light modulation cells 30a in the region A and the light modulation cells 30a and 30b in the regions B to D. As illustrated in FIG. 19, in the case where a relationship between the voltage (applied voltage) applied to the light modulation cells 30a and 30b and whiteness of illumination light emitted from the light modulation cells 30a and 30b is under a condition 1 illustrated in FIG. 19, the light modulation layers 34 in the light modulation cells 30a in the region A and the light modulation cells 30a and 30b in the regions B to D are turned into transparent regions 30A, and these cells are in a light extinction state. At this time, the light modulation layer 34 in the light modulation cell 30b in the region A is the scattering region 30B, and the light modulation cell 30b in the region A is in a light emission state.

It is to be noted that, in the case where the relationship between the applied voltage and whiteness is under a condition 2 in FIG. 19, when the AC potential with the amplitude Vr or the amplitude Vc is applied to the light modulation cells 30a and 30b, whiteness is not 1, and is reduced to approximately a half of 1. Therefore, it is preferable that, when the AC potential with the amplitude Vr or the amplitude Vc is applied to the light modulation cells 30a and 30b, whiteness be equivalent to luminance when the AC potential with the amplitude (Vr+Vc) is applied. More specifically, the amplitude Vr and the amplitude Vc are preferably equal to or larger than that of a threshold potential allowing the property of the light modulation layer 34 to be switched from the scattering property to transparency when only the AC potential with the amplitude Vr or the amplitude Vc is applied to the light modulation layer 34.

Figure 20:
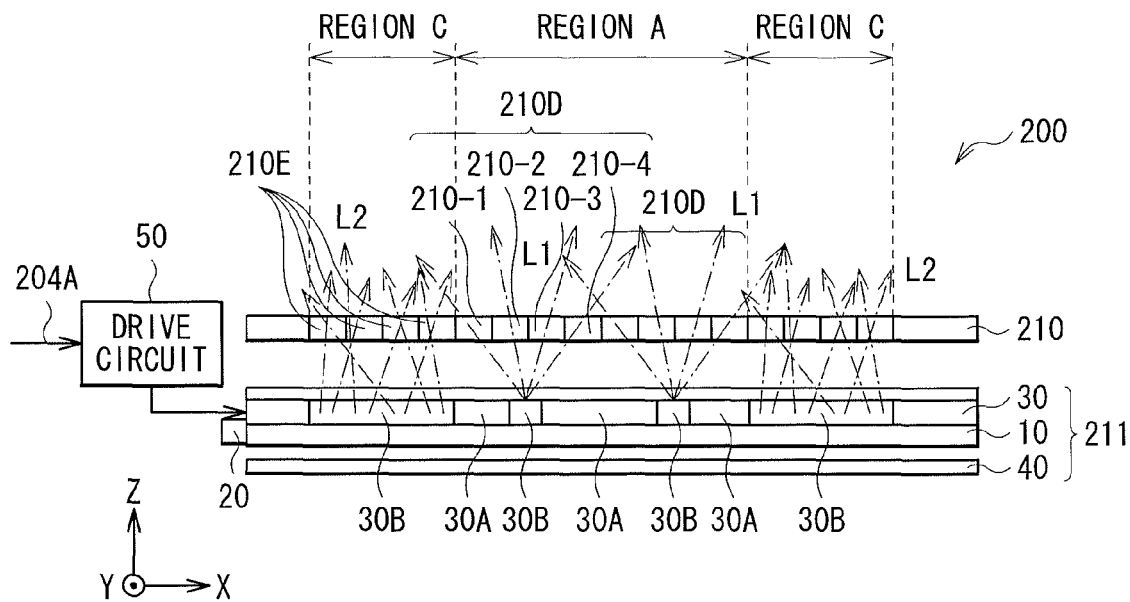
FIG. 20 is a schematic view illustrating an example of a state where three-dimensional display is mixed with two-dimensional display when viewed from a section of the receiver-side unit.

FIG. 20 illustrates a state where a plurality of linear illumination light beams L1 are emitted from the region A and planar illumination light L2 is emitted from the region C. In the region A, for example, the panel drive circuit 209 drives four pixels 210-1 to 210-4 of the display panel 210 as one three-dimensional pixel 210D. At this time, the drive circuit

50 forms, for example, one scattering region 30B in each three-dimensional pixel 210D, and allows the linear illumination light beams L1 to enter into the pixels 210-1 to 210-4 at incident angles different from one another, respectively. Thus, the respective linear illumination light beams L1 enter, at a substantially equal angle, into pixels (for example, 210-1, 210-2, 210-3, or 210-4 in FIG. 20) in the same position in respective three-dimensional pixels 210D. As a result, image light modulated by the pixels in the same position in respective three-dimensional pixels 210D is emitted from the pixels at a predetermined angle. At this time, for example, a viewer simultaneously views image light from the pixel 210-3 with his right eye and image light from the pixel 210-2 with his left eye. In other words, the viewer views different images having a parallax therebetween with his right and left eyes. As a result, the viewer perceives that a three-dimensional image (a stereoscopic image) is displayed in the region A of the display panel 210.

In the region C, for example, the panel drive circuit 209 drives respective pixels 210E (pixels corresponding to the above-described pixels 210-1, 210-2, 210-3, or 210-4) of the display panel 210 as two-dimensional pixels. At this time, for example, the drive circuit 50 forms the scattering region 30B in the entire region C, and allows the planar illumination light L2 to enter into respective pixels 210E. Thus, the viewer perceives that a two-dimensional image (a planar image) is displayed in the region C of the display panel 210.

Next, functions and effects of the backlight 211 according to this embodiment will be described below.

In the backlight 211 according to the embodiment, the light modulation layer 34 exhibiting the scattering property or transparency with respect to light from the light source 20, depending on a potential difference generated by the sub-electrodes 32B, 32C, and 36A is provided in the backlight 211. Therefore, light emitted from the light source 20 and propagating through the transparent substrate 31 and the like passes through a region (the transparent region 30A) exhibiting transparency by potential difference control of the light modulation layer 34 to be totally reflected by a top surface of the light guide plate 10 or to be reflected by the top surface of the light guide plate 10 with high reflectivity. On the other hand, light propagating through the transparent substrate 31 and the like is scattered in a region (the scattering region 30B) exhibiting the scattering property by potential difference control of the light modulation layer 34 to pass through the top surface of the light guide plate 10. Therefore, illumination light is hardly emitted from a region corresponding to the transparent region 30A of the light emission region 211A of the backlight 211. Moreover, illumination light is emitted from a region corresponding to the scattering region 30B of the light emission region of the backlight 211. Thus, in the embodiment, illumination light is emitted from a part of the light modulation layer 34 or the entire light modulation layer 34, depending on the layout of the sub-electrodes 32B, 32C, and 36A and an applied voltage; therefore, switching between three-dimensional display and two-dimensional display is performed. Moreover, in the embodiment, when a two-dimensional image, a three-dimensional image, or an image including a two-dimensional image and a three-dimensional image is displayed on the display panel 210, the sub-electrodes 32B, 32C, and 36A are driven to allow the in-plane distribution of a potential difference between the sub-electrodes 32B or the sub-electrodes 32C and the sub-electrodes 36A to be constant within one frame period. Thus, the numbers of sub-electrodes 32B, 32C, and 36A are not limited by a driving method. Therefore, the numbers of sub-electrodes 32B, 32C, and 36A are increased as necessary to allow a region where illumination light is partially emitted in a plane to be smaller. Thus, illumination light is partially emitted from a smaller region of the plane at low cost.

[Modification]

Figure 21:
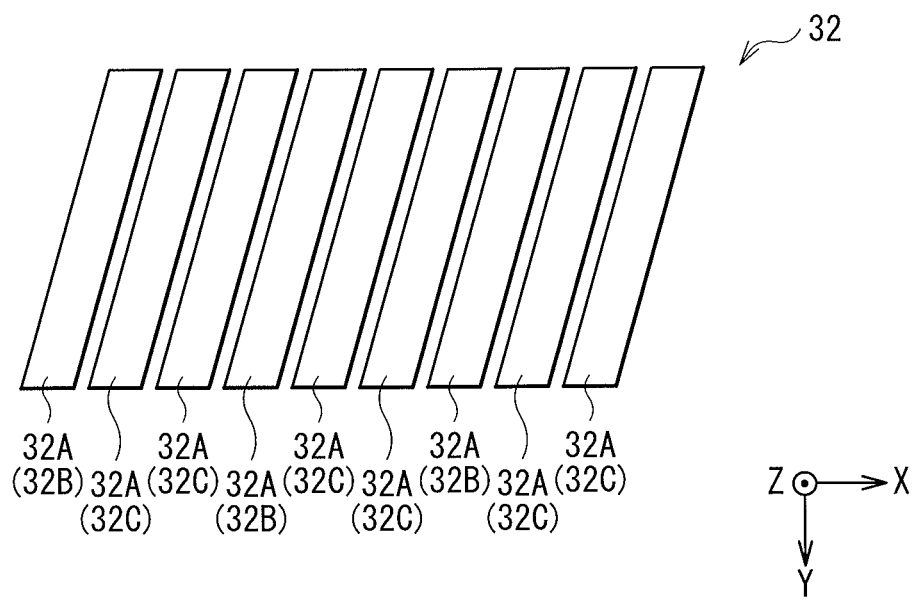
FIG. 21 is a plan view illustrating a first modification of the configuration of the lower electrode in FIG. 6.
Figure 22:
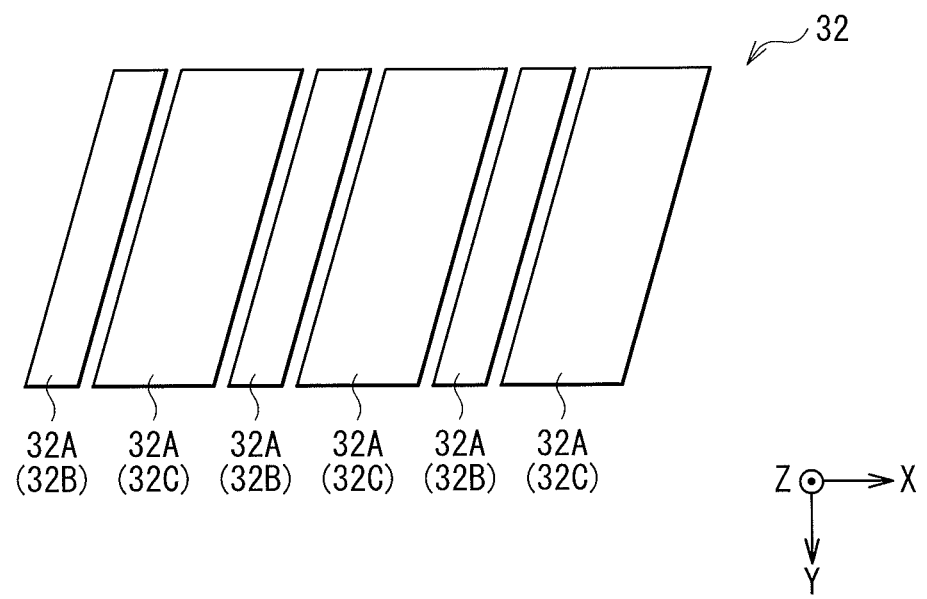
FIG. 22 is a plan view illustrating a first modification of the configuration of the lower electrode in FIG. 8.
Figure 23:
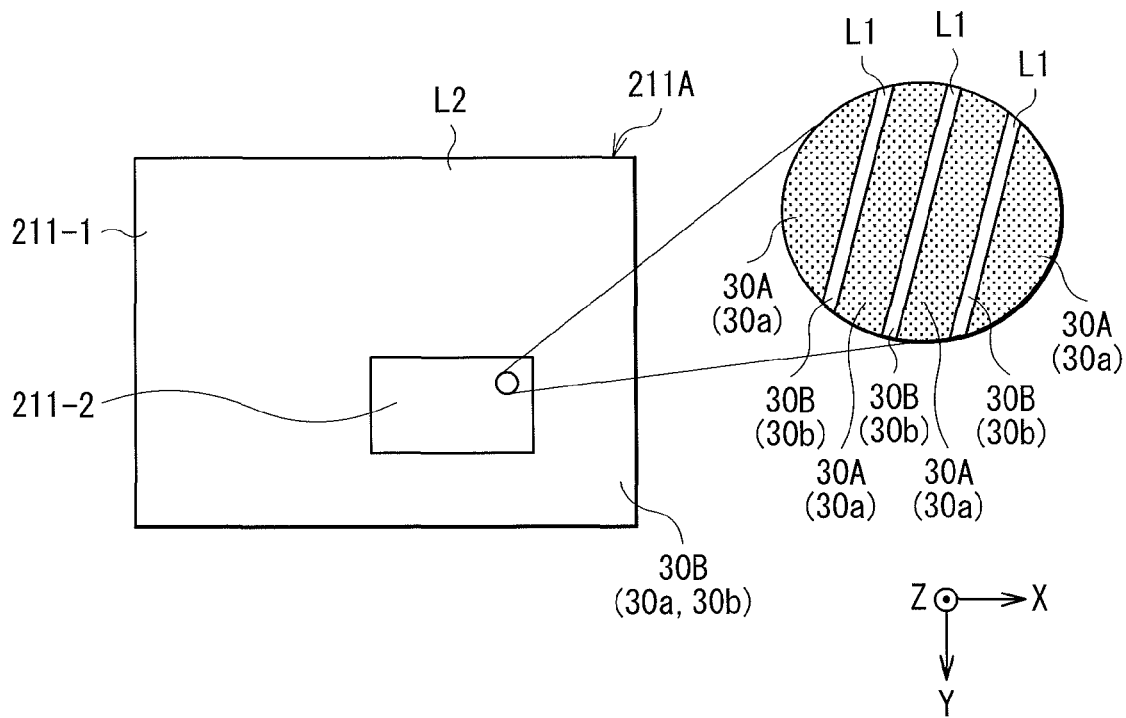
FIG. 23 is a plan view illustrating a first modification of the distribution of illumination light from the backlight.
Figure 24:
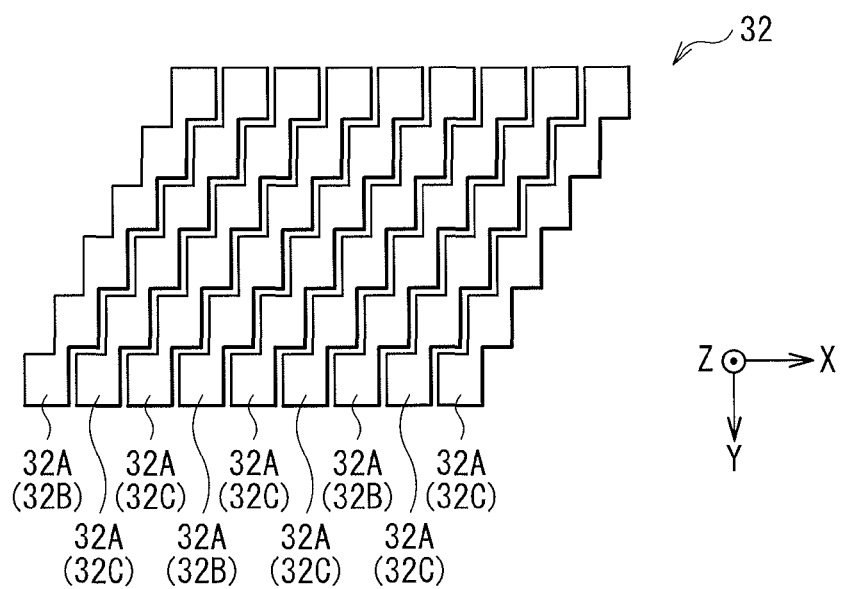
FIG. 24 is a plan view illustrating a second modification of the configuration of the lower electrode in FIG. 6.
Figure 25:
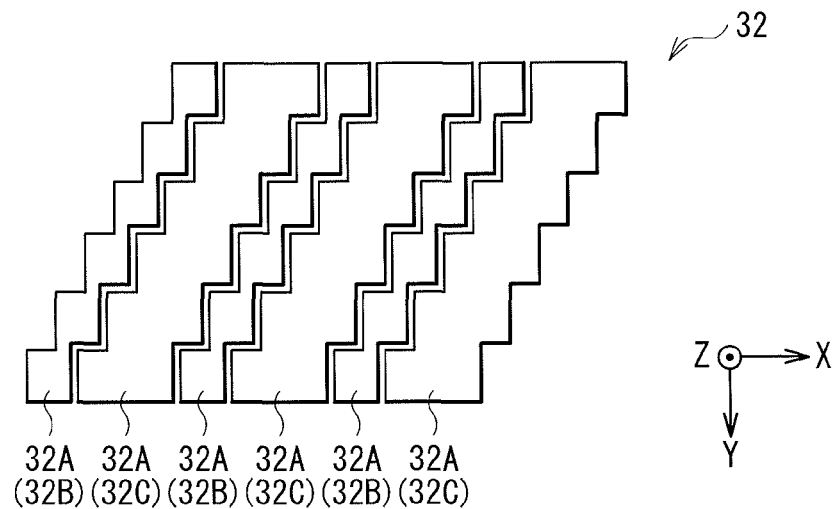
FIG. 25 is a plan view illustrating a second modification of the configuration of the lower electrode in FIG. 8.
Figure 26:
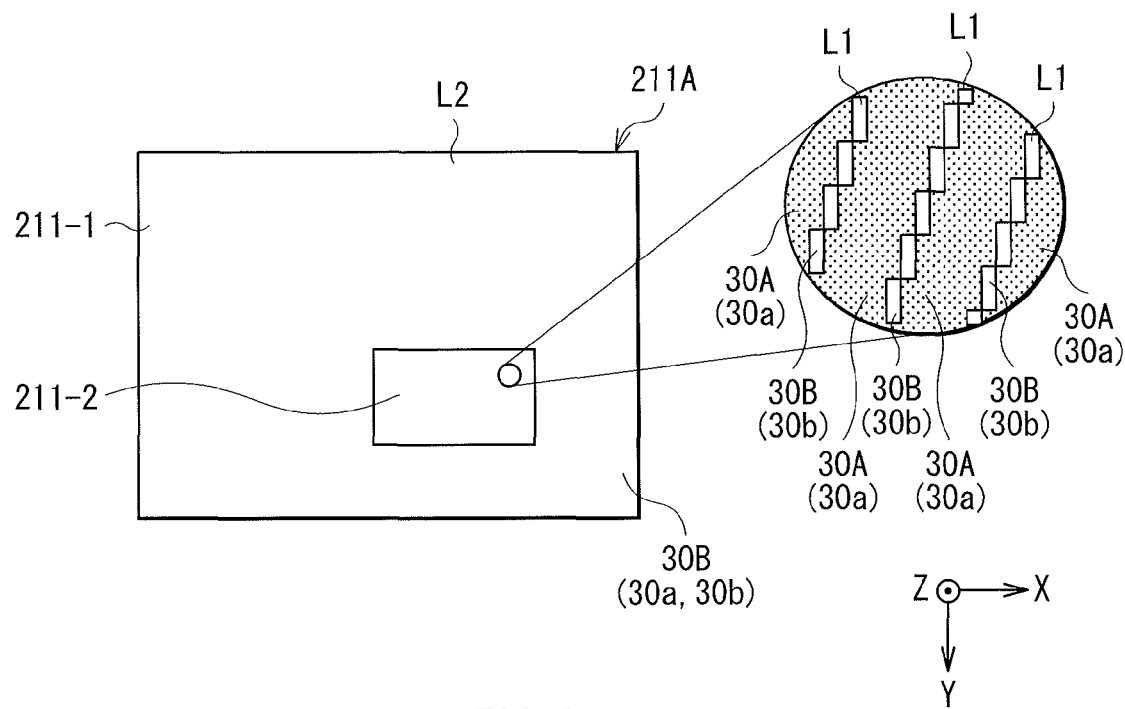
FIG. 26 is a plan view illustrating a second modification of the distribution of illumination light from the backlight.

In the above-described embodiment, the sub-electrodes 32B and 32C extend in a direction parallel to the Y-axis direction (a direction parallel to the light incident surface 10A); however, as illustrated in FIGS. 21 and 22, the sub-electrodes 32B and 32C may extend in a direction intersecting with the Y-axis direction (a direction intersecting with the light incident surface 10A). In this case, in the region A of the backlight 211, as illustrated in FIG. 23, the linear illumination light beams L1 extend in a direction where the sub-electrodes 32B extend (that is, the direction intersecting with the light incident surface 10A). Moreover, for example, as illustrated in FIGS. 24 and 25, the sub-electrodes 32B and 32C each may have a stepwise shape (a step barrier shape). In this case, in the region A of the backlight 211, as illustrated in FIG. 26, the linear illumination light beams L1 also have a stepwise shape (a step barrier shape). It is to be noted that, in this modification, the widths of the sub-electrodes 32B and 32C are preferably equal to the width of the sub-pixel of R, G, B, or the like of the display panel 210 or an integral multiple of the width of the sub-pixel in terms of moire reduction.

(2. Second Embodiment)

Next, a display unit according to a second embodiment of the disclosure will be described below. In the display unit according to the embodiment, vertical alignment films are used as the alignment films 33 and 35, and, as illustrated in FIGS. 27A to 27C and 28A to 28C, a light modulation layer 64 is provided instead of the light modulation layer 34. Therefore, the light modulation layer 64 will be described in detail below.

Figure 27A:
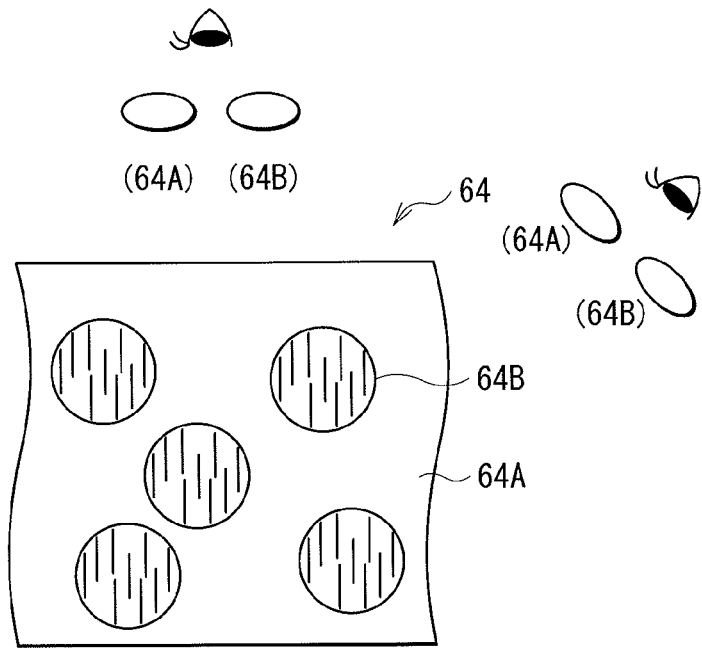
FIGS. 27A to 27C are schematic views for describing an example of a function of the light modulation layer in FIGS. 5 and 7 when the light modulation layer is in the normally black mode and in a vertical alignment mode.

The light modulation layer 64 exhibits the scattering property or transparency with respect to light from the light source 20, depending on the magnitude of an electric field. The light modulation layer 64 exhibits transparency with respect to light from the light source 20 when the electric field is relatively small, and exhibits the scattering property with respect to light from the light source 20 when the electric field is relatively large. For example, as illustrated in FIG. 27A, the light modulation layer 64 is a composite layer including a bulk 64A and a plurality of microparticles 64B dispersed in the bulk 64A. The bulk 64A and the microparticles 64B have optical anisotropy.

Figure 27B:
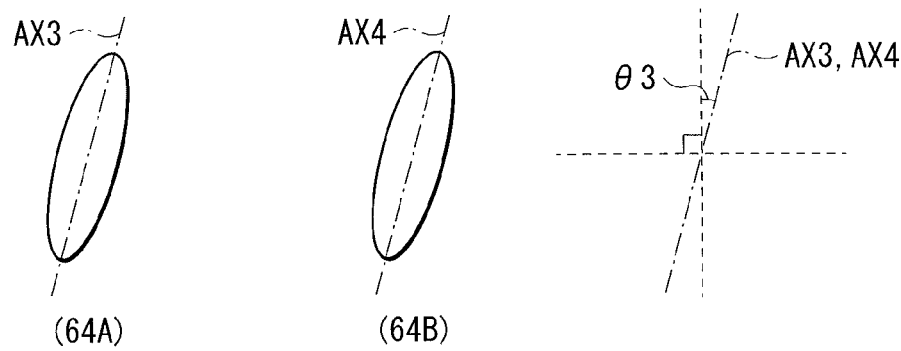
Figure 27C:
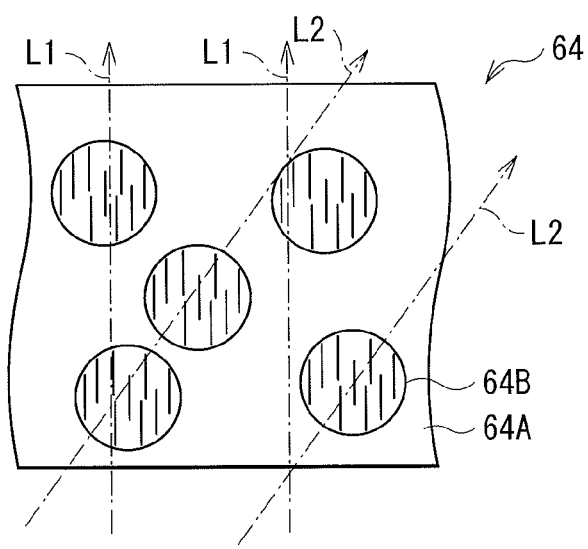

FIG. 27A schematically illustrates an example of an alignment state in the microparticles 64B under no potential difference application. It is to be noted that, in FIG. 27A, an alignment state in the bulk 64A is not illustrated. FIG. 27B illustrates an example of refractive index ellipsoids exhibiting refractive index anisotropy of the bulk 64A and the microparticle 64B under no potential difference application. FIG. 27C schematically illustrates an example of a state where light L1 toward a front direction and light L2 toward an oblique direction pass through the light modulation layer 64 under no potential difference application.

Figure 28A:
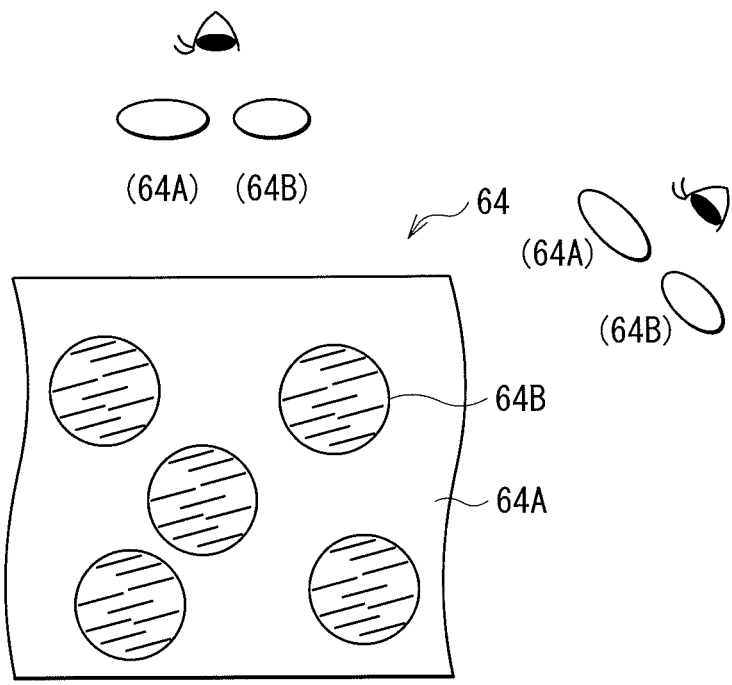
FIGS. 28A to 28C are schematic views for describing another example of the function of the light modulation layer in FIGS. 5 and 7 when the light modulation layer is in the normally black mode and in the vertical alignment mode.
Figure 28B:
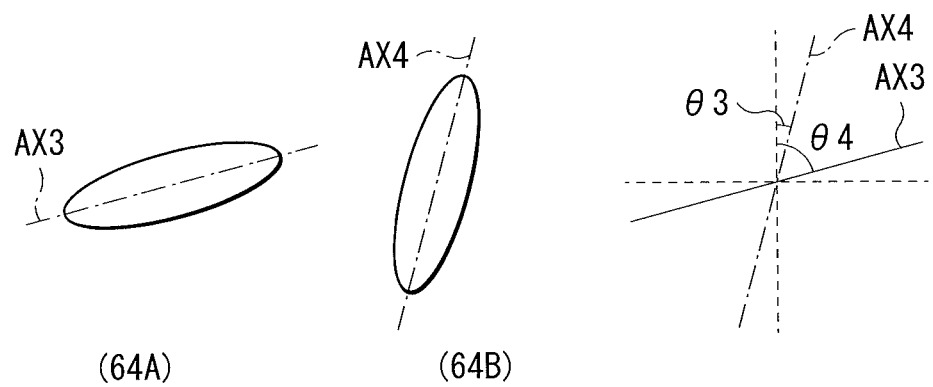
Figure 28C:
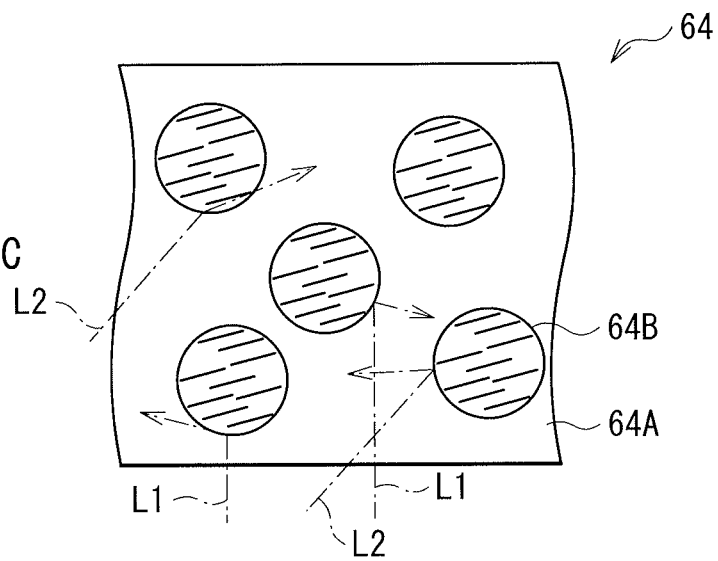

FIG. 28A schematically illustrates an example of an alignment state in the microparticles 64B under potential difference application. It is to be noted that, in FIG. 28A, an alignment state in the bulk 64A is not illustrated. FIG. 28B illustrates an example of refractive index ellipsoids exhibiting refractive index anisotropy of the bulk 64A and the microparticle 64B under potential difference application. FIG. 28C schematically illustrates an example of a state where the light L1 toward the front direction and the light L2 toward the oblique direction are scattered by the light modulation layer 64 under potential difference application.

For example, as illustrated in FIGS. 28A and 28B, the bulk 64A and the microparticle 64B are structured to allow the direction of an optical axis AX3 of the bulk 64A and the direction of an optical axis AX4 of the microparticle 64B to coincide with (be parallel to) each other under no potential difference application. It is to be noted that the optical axes AX3 and AX4 each indicate a line parallel to a travel direction of a light beam allowing a refractive index to have one value irrespective of polarization direction. Moreover, it is not necessary for the directions of the optical axis AX3 and the optical axis AX4 to consistently coincide with each other, and the directions of the optical axis AX3 and the optical axis AX4 may be slightly deviated from each other due to, for example, a manufacturing error.

Moreover, for example, the microparticle 64B is structured to allow the optical axis AX4 thereof to be parallel to the light incident surface 10A of the light guide plate 10 under no potential difference application. For example, the microparticle 64B is further structured to allow the optical axis AX4 thereof to intersect with surfaces of the transparent substrates 31 and 37 at a slight angle θ3 (refer to FIG. 27B) under no potential difference application. It is to be noted that the angle θ3 will be described in more detail when a material forming the microparticle 64B is described.

On the other hand, for example, the bulk 64A is structured to have a fixed optical axis AX4 irrespective of whether or not a potential difference is applied between the lower electrode 32 and the upper electrode 36. More specifically, for example, as illustrated in FIGS. 27A, 27B, 28A, and 28B, the bulk 64A is structured to have the optical axis AX3 parallel to the light incident surface 10A of the light guide plate 10 as well as intersecting with the surfaces of the transparent substrates 31 and 37 at a predetermined angle θ4. In other words, the optical axis AX3 of the bulk 64A is parallel to the optical axis AX4 of the microparticle 64B when a voltage is not applied between the lower electrode 32 and the upper electrode 36.

It is to be noted that it is not necessary for the optical axis AX4 to be consistently parallel to the light incident surface 10A of the light guide plate 10 as well as to consistently intersect with the surfaces of the transparent substrates 31 and 37 at the angle θ3, and the optical axis AX4 may intersect with the surfaces of the transparent substrates 31 and 37 at an angle slightly different from the angle θ3 due to, for example, a manufacturing error. Moreover, it is not necessary for the optical axes AX3 and AX4 to be consistently parallel to the light incident surface 10A of the light guide plate 10, and the optical axes AX3 and AX4 may intersect with the light incident surface 10A of the light guide plate 10 at a small angle due to, for example, a manufacturing error.

In this case, ordinary refractive indices of the bulk 64A and the microparticle 64B are preferably equal to each other, and extraordinary refractive indices of the bulk 64A and the microparticle 64B are preferably equal to each other. In this case, for example, when a voltage is not applied between the lower electrode 32 and the upper electrode 36, as illustrated in FIG. 27B, there is little difference in refractive index in all directions including the front direction and the oblique direction, and high transparency is obtained. Therefore, for example, as illustrated in FIG. 27C, the light L1 toward the front direction and the light L2 toward the oblique direction pass through the light modulation layer 64 without being scattered in the light modulation layer 64. As a result, as in the case of the above-described embodiment, light L from the light source 20 (light from an oblique direction) is totally reflected by an interface (an interface between the transparent substrate 31 or the light guide plate 10 and air) of the transparent region 30A, and luminance (luminance in a black state of display) in the transparent region 30A is decreased, compared to the case where the light modulation device 60 is not provided.

Moreover, for example, as illustrated in FIG. 28B, the bulk 64A and the microparticle 64B are structured to allow the direction of the optical axis AX3 and the direction of the optical axis AX4 to be different from (intersect with) each other under potential difference application. Further, for example, under potential difference application, the microparticle 64B is structured to allow the optical axis AX4 thereof to be parallel to the light incident surface 10A of the light guide plate 10 as well as to intersect with the surfaces of the transparent substrates 31 and 37 at the angle θ4 larger than the angle θ3 or be parallel to the surfaces of the transparent substrate 31 and 37. It is to be noted that the angle θ4 will be described in more detail when a material forming the microparticle 64B is described.

Therefore, under potential difference application, in the light modulation layer 64, a difference in refractive index in all directions including the front direction and the oblique direction is increased to obtain a high scattering property. For example, as illustrated in FIG. 28C, the light L1 toward the front direction and the light L2 toward the oblique direction are thereby scattered in the light modulation layer 64. As a result, as in the above-described embodiment, for example, the light L from the light source 20 (light from the oblique direction) passes through an interface (an interface between the transparent substrate 31 or the light guide plate 10 and air) of the scattering region 30B, and light having passed toward the reflective plate 40 is reflected by the reflective plate 40 to pass through the light modulation device 60. Therefore, the luminance of the scattering region 30B is extremely higher than that in the case where the light modulation device 60 is not provided, and luminance in a white state of display is partially increased (partial luminance enhancement) by a reduced amount of the luminance of the transparent region 30A.

It is to be noted that the ordinary refractive indices of the bulk 64A and the microparticle 64B may be slightly different from each other due to, for example, a manufacturing error, and are preferably, for example, 0.1 or less, and more preferably 0.05 or less. Moreover, the extraordinary refractive indices of the bulk 64A and the microparticle 64B may be slightly different from each other due to, for example, a manufacturing error, and are preferably, for example, 0.1 or less, and more preferably 0.05 or less.

Moreover, a refractive index difference in the bulk 64A ($\Delta n_0$=extraordinary refractive index $n_1$−ordinary refractive index $n_0$) and a refractive index difference in the microparticle 64B ($\Delta n_1$=extraordinary refractive index $n_3$−ordinary refractive index $n_2$) are preferably as large as possible, and are preferably 0.05 or over, more preferably 0.1 or over, and still more preferably 0.15 or over. In the case where the refractive index differences in the bulk 64A and the microparticle 64B are large, the scattering power of the light modulation layer 64 is enhanced to allow light guide conditions to be easily disrupted, thereby allowing light from the light guide plate 10 to be easily extracted.

Further, the bulk 64A and the microparticle 64B have different response speeds with respect to an electric field. The bulk 64A has, for example, a streaky structure or a porous structure not responding to an electric field, or a rod-like structure having a response speed slower than that of the microparticle 64B. The bulk 64A is formed of, for example, a polymer material obtained by polymerizing a low-molecular monomer. The bulk 64A is formed, for example, by polymerizing, by one or both of heat and light, a material (for example, a monomer) with orientation and polymerization which is aligned along the alignment direction of the microparticles 64B or the alignment directions of the alignment films 33 and 35.

On the other hand, the microparticles 64B mainly include, for example, a liquid crystal material, and have a response speed sufficiently higher than that of the bulk 64A. Examples of the liquid crystal material (liquid crystal molecules) included in the microparticles 64B include rod-like molecules. As liquid crystal molecules included in the microparticles 64B, liquid crystal molecules having negative dielectric constant anisotropy (a so-called negative type liquid crystal) are preferably used.

In this case, under no potential difference application, the long-axis directions of the liquid crystal molecules in the microparticles 64B are parallel to the optical axis AX4. At this time, the long axes of the liquid crystal molecules in the microparticles 64B are parallel to the light incident surface 10A of the light guide plate 10, as well as intersect with a normal to the transparent substrates 31 and 37 at the slight angle θ3. The slight angle θ3 is, for example, a small angle of approximately 1°, and is called "pretilt angle". In other words, the liquid crystal molecules in the microparticle 64B are aligned to be tilted at the angle θ3 in a plane parallel to the light incident surface 10A of the light guide plate 10 under no potential difference application.

Moreover, under potential difference application, in the microparticles 64B, the long-axis directions of the liquid crystal molecules intersect with (or is substantially orthogonal to) the optical axis AX4. At this time, the long axes of the liquid crystal molecules in the microparticles 64B are parallel to the light incident surface 10A of the light guide plate 10, as well as intersect with the normal to the transparent substrates 31 and 37 at the angle θ4 which is larger than the angle θ3. In other words, under potential difference application, the liquid crystal molecules in the microparticles 64B are aligned to be tilted at the angle θ4 in a plane parallel to the light incident surface 10A of the light guide plate 10 or to fall at the angle θ4 (=90°).

The above-described monomer with orientation and polymerization may be a material having optical anisotropy and forming a composite material with a liquid crystal; however, a low-molecular monomer which is cured with ultraviolet light is preferable in this embodiment. It is preferable that, in a state where no voltage is applied, directions of optical anisotropy of the liquid crystal and a resultant (a polymer material) formed by polymerizing a low-molecular monomer coincide with each other; therefore, before curing the low-molecular monomer with ultraviolet light, the liquid crystal and the low-molecular monomer are preferably aligned in the same direction. In the case where the liquid crystal is used as the microparticles 64B, when the liquid crystal includes rod-like molecules, the used monomer material preferably has a rod-like shape. As described above, a material having both of polymerization and liquid crystal properties is preferably used as the monomer material, and, for example, the monomer material preferably includes one or more functional groups selected from the group consisting of an acrylate group, a methacrylate group, an acryloyloxy group, a methacryloyloxy group, a vinyl ether group, and an epoxy group as polymerizable functional groups. These functional groups are allowed to be polymerized by ultraviolet, infrared, or electron irradiation, or by heating. To suppress a reduction in the degree of alignment under ultraviolet irradiation, a liquid crystal material having a polyfunctional group may be added.

Next, functions and effects of the backlight 211 according to this embodiment will be described below.

In the backlight 211 according to this embodiment, as in the case of the above-described embodiment, the light modulation layer 64 exhibiting the scattering property or transparency with respect to light from the light source 20, depending on a potential difference generated by the sub-electrodes 32B, 32C, and 36A is provided in the backlight 211. Therefore, light emitted from the light source 20 and propagating through the transparent substrate 31 and the like passes through a region (the transparent region 30A) exhibiting transparency by potential difference control of the light modulation layer 64 to be totally reflected by a top surface of the light guide plate 10 or to be reflected by the top surface of the light guide plate 10 with high reflectivity. On the other hand, light propagating through the transparent substrate 31 and the like is scattered in a region (the scattering region 30B) exhibiting the scattering property by potential difference control of the light modulation layer 64 to pass through the top surface of the light guide plate 10. Therefore, illumination light is hardly emitted from a region corresponding to the transparent region 30A of the light emission region 211A of the backlight 211. Moreover, illumination light is emitted from a region corresponding to the scattering region 30B of the light emission region of the backlight 211. Thus, in the embodiment, illumination light is emitted from a part of the light modulation layer 64 or the entire light modulation layer 64, depending on the layout of the sub-electrodes 32B, 32C, and 36A and an applied voltage; therefore, switching between three-dimensional display and two-dimensional display is performed. Moreover, in the embodiment, when a two-dimensional image, a three-dimensional image, or an image including a two-dimensional image and a three-dimensional image is displayed on the display panel 210, the sub-electrodes 32B, 32C, and 36A are driven to allow the in-plane distribution of a potential difference between the sub-electrodes 32B or the sub-electrodes 32C and the sub-electrodes 36A to be constant within one frame period. Thus, the numbers of sub-electrodes 32B, 32C, and 36A are not limited by a driving method. Therefore, the numbers of sub-electrodes 32B, 32C, and 36A are increased as necessary to allow a region where illumination light is partially emitted in a plane to be smaller. Thus, illumination light is partially emitted from a smaller region of the plane at low cost.

[Modification]

In the above-described second embodiment, the sub-electrodes 32B and 32C extend in a direction parallel to the Y-axis direction (a direction parallel to the light incident surface 10A); however, as illustrated in FIGS. 21 and 22, the sub-electrodes 32B and 32C may extend in a direction intersecting with the Y-axis direction (a direction intersecting with the light incident surface 10A). In this case, in the region A of the backlight 211, as illustrated in FIG. 23, the linear illumination light beams L1 extend in a direction where the sub-electrodes 32B extend (that is, the direction intersecting with the light incident surface 10A). Moreover, for example, as illustrated in FIGS. 24 and 25, the sub-electrodes 32B and 32C each may have a stepwise shape (a step barrier shape). In this case, in the region A of the backlight 211, as illustrated in FIG. 26, the linear illumination light beams L1 also have a stepwise shape (a step barrier shape). It is to be noted that, in this modification, the widths of the sub-electrodes 32B and 32C are preferably equal to the width of the sub-pixel of R, G, B, or the like of the display panel 210 or an integral multiple of the width of the sub-pixel in terms of moire reduction.

(3. Third Embodiment)

In the above-described embodiments, the bulks 34A and 64A have optical anisotropy; however, the bulks 34A and 64A may have optical isotropy. In this case, the bulks 34A and 64A are formed of a polymer material which is formed by curing an isotropic low-molecular material and exhibits isotropy with respect to light from the light source 20.

For convenience of description, hereinafter, a bulk having optical isotropy is referred to as "bulk 74A". Moreover, the bulk 74A is hereinafter used instead of the bulk 34A. Next, optical characteristics of a light modulation device 70 (not illustrated) including a light modulation layer 74 which includes the bulk 74A and the microparticles 34B will be described below.

Figure 29A:
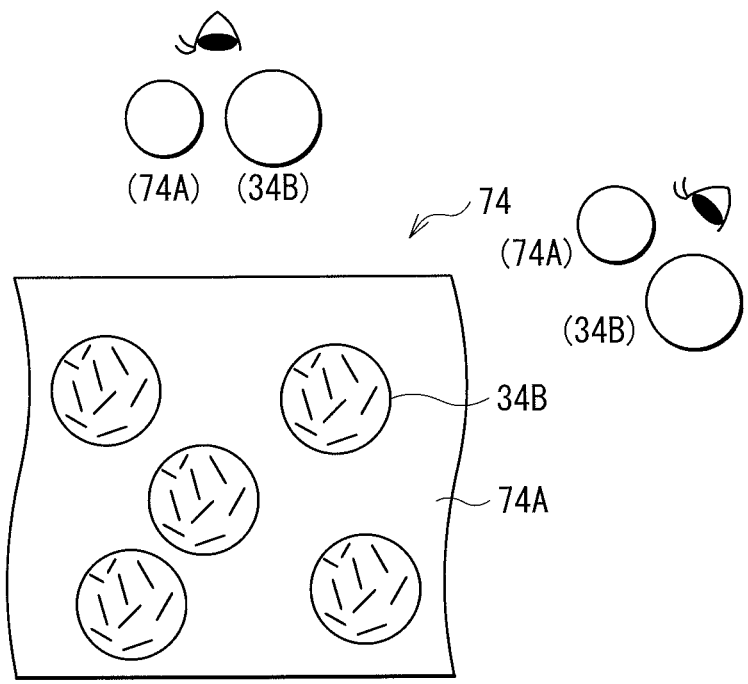
FIGS. 29A and 29B are schematic views for describing an example of a function of the light modulation layer in FIGS. 5 and 7 when the light modulation layer is in a normally white mode.
Figure 29B:
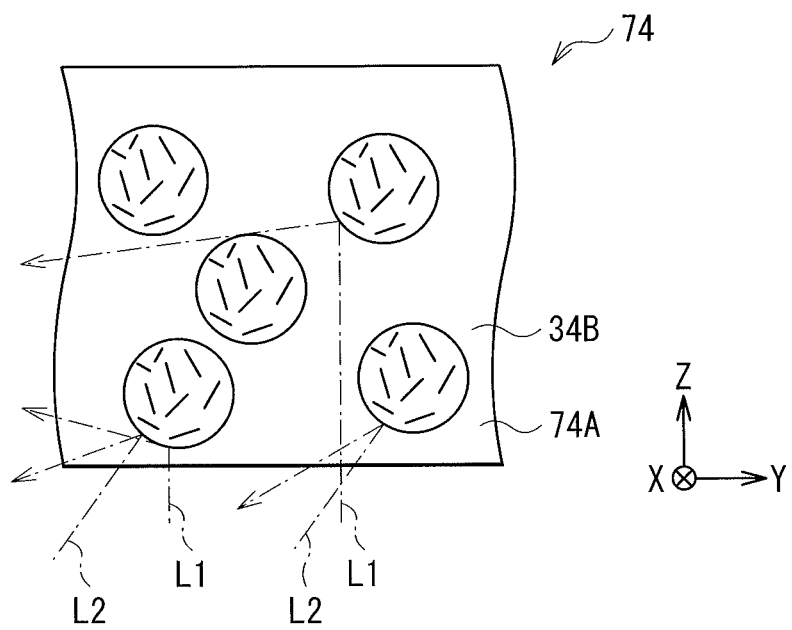

FIG. 29A schematically illustrates an example of an alignment state in the microparticles 34B under no potential difference application. It is to be noted that the bulk 74A and the microparticles 34B exhibit isotropy, and are not aligned. FIG. 29B schematically illustrates an example of a state where light L1 toward a front direction and light L2 toward an oblique direction are scattered by the light modulation layer 74 under no potential difference application.

Figure 30A:
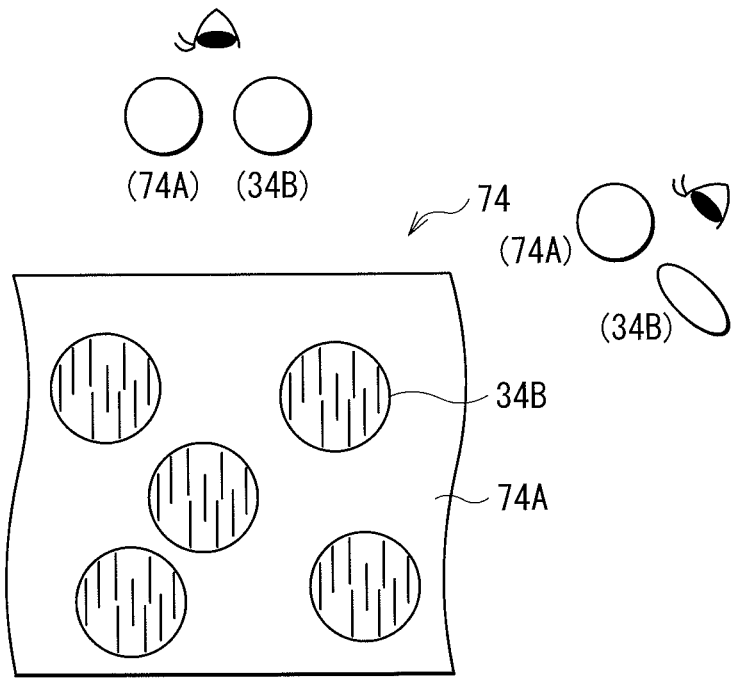
FIGS. 30A and 30B are schematic views for describing another example of the function of the light modulation layer in FIGS. 5 and 7 when the light modulation layer is in the normally white mode.
Figure 30B:
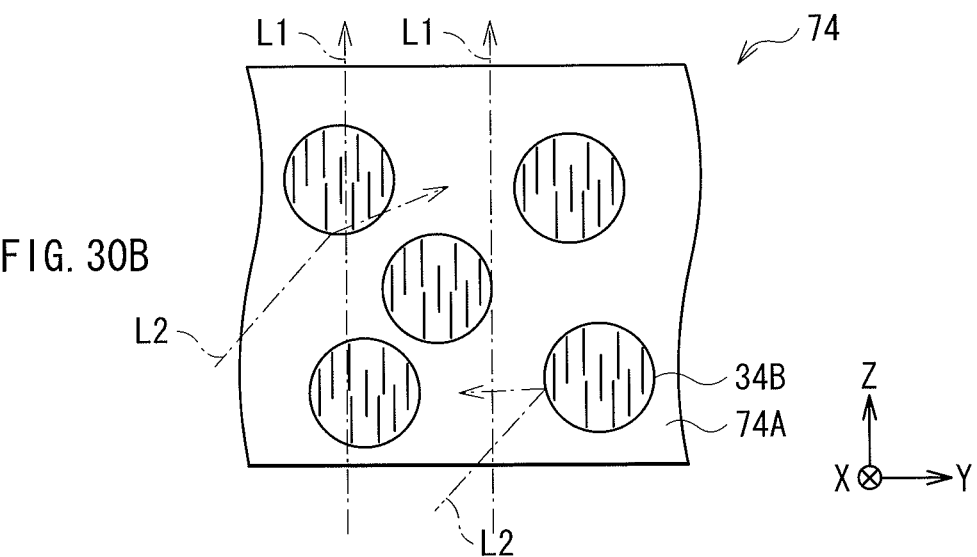

FIG. 30A schematically illustrates an example of an alignment state in the microparticles 34B under potential difference application. It is to be noted that the bulk 74A exhibits isotropy even in this case, and is not aligned. The microparticles 34B are aligned in the direction of an applied voltage. FIG. 30B schematically illustrates an example of a state where the light L1 toward the front direction and the light L2 toward the oblique direction pass through the light modulation layer 74 under potential difference application.

For example, under no potential difference application, optical axes of the microparticles 34B are oriented in random directions, and the microparticles 34B exhibit optical isotropy as a whole. Moreover, for example, under potential difference application, the optical axes of the microparticles 34B are parallel to the light incident surface 10A of the light guide plate 10 as well as orthogonal to the surfaces of the transparent substrates 31 and 37. On the other hand, for example, the bulk 74A exhibits isotropy irrespective of whether or not a voltage is applied between the lower electrode 32 and the upper electrode 36.

The refractive index of the bulk 74A and the ordinary refractive index of the microparticles 34B are equal to or substantially equal to each other. The refractive index of the bulk 74A and the extraordinary refractive index of the microparticles 34B are different from each other. Moreover, the refractive index of the bulk 74A and the refractive index of the microparticles 34B exhibiting optical isotropy are different from each other.

Under potential difference application, there is little difference in refractive index between the bulk 74A and the microparticles 34B in a direction intersecting with the surface of the transparent substrates 31 and 37, and a difference in refractive index between the bulk 74A and the microparticles 34B is increased in a direction parallel to the surfaces of the transparent substrates 31 and 37. Therefore, as illustrated in FIG. 30B, high transparency is obtained in the direction orthogonal to the surfaces of the transparent substrates 31 and 37, and a high scattering property is obtained in the direction parallel to the surfaces of the transparent substrates 31 and 37. As a result, for example, the light L from the light source 20 (light from the oblique direction) is totally reflected by an interface (an interface between the transparent substrate 31 or the light guide plate 10 and the air) of the transparent region 30A, and luminance (luminance in a black state of display) of the transparent region 30A is decreased, compared to the case where the light modulation device 70 is not provided. Thus, the leakage of light in a range having a large view angle is reduced or substantially eliminated.

On the other hand, under no potential difference application, a difference in refractive index between the bulk 74A and the microparticles 34B in all directions is increased. Therefore, as illustrated in FIG. 29B, a high scattering property is obtained. As a result, for example, the light L from the light source 20 (light from the oblique direction) passes through the interface (the interface between the transparent substrate 31 or the light guide plate 10 and air) of the scattering region 30B, and light having passed toward the reflective plate 40 is reflected by the reflective plate 40 to pass through the light modulation device 70. Therefore, the luminance of the scattering region 30B is extremely higher than that in the case where the light modulation device 70 is not provided, and luminance in a white state of display is partially increased (partial luminance enhancement) by a reduced amount of the luminance of the transparent region 30A.

Figure 31:
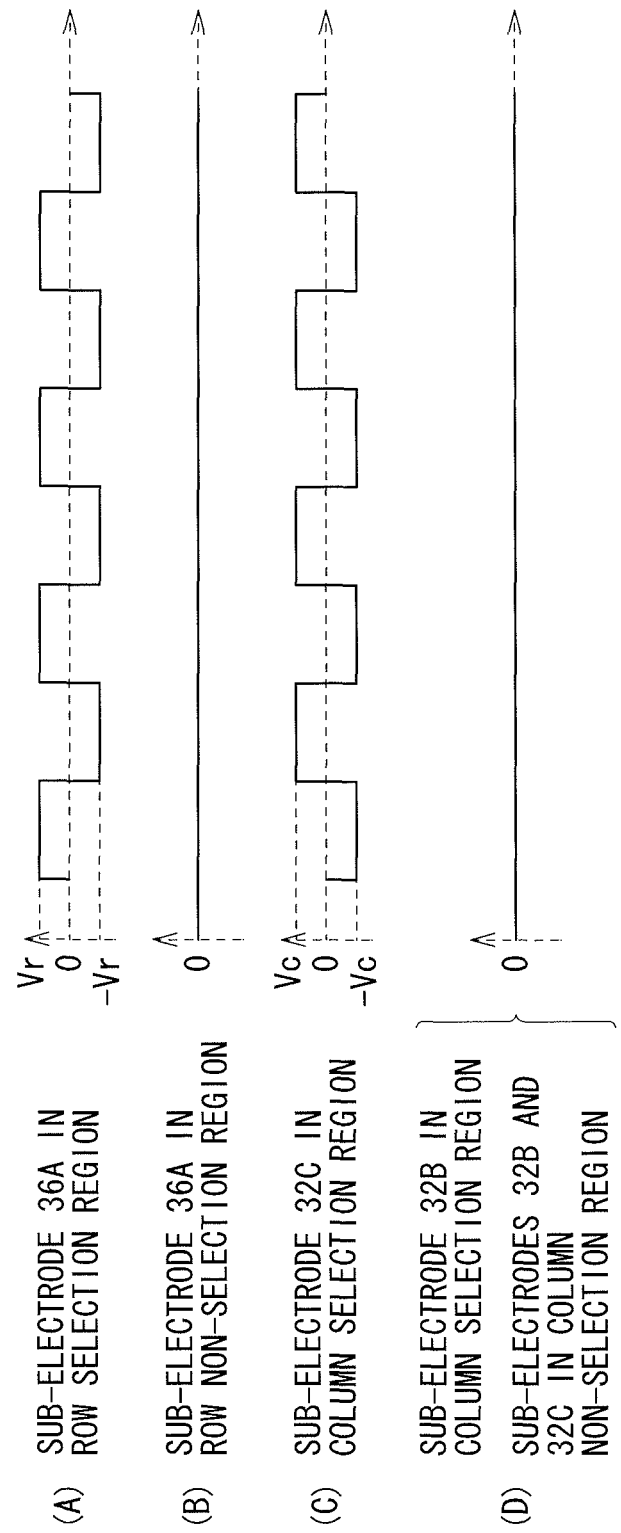
FIG. 31 is a waveform chart illustrating an example of a drive signal applied to the backlight when the light modulation layer in FIGS. 5 and 7 is in the normally white mode.

FIG. 31 illustrates an example of various voltage waveforms applied to the sub-electrodes 32B, 32C, and 36A in this embodiment. The voltage waveforms in FIG. 31 is based on the premise that the light modulation layer 74 is in a normally white mode in which the light modulation layer 74 is switched into a transmission state under voltage application and is switched into a scattering state under no voltage application.

The drive circuit 50 drives each of the sub-electrodes 32B, 32C, and 36A to allow an in-plane distribution of a potential difference between the sub-electrodes 32B or the sub-electrodes 32C and the sub-electrodes 36A to be constant within one frame period. More specifically, as illustrated in parts (B) and (D) in FIG. 31, the drive circuit 50 applies a fixed potential (for example, a ground potential) to the sub-electrodes 36A in the row non-selection region, the sub-electrodes 32B in the column selection region, and the sub-electrodes 32B and 32C in the column non-selection region. Moreover, as illustrated in parts (A) and (C) in FIG. 31, the drive circuit 50 applies AC potentials with phases in synchronization with each other to the sub-electrodes 36A in the row selection region and the sub-electrodes 32C in the column selection region. The drive circuit 50 applies to an AC potential with an amplitude Vr to the sub-electrodes 36A in the row selection region, and applies an AC potential with an amplitude Vc to the sub-electrodes 32C in the column selection region. The amplitude Vr and the amplitude Vc are preferably equal to each other, but may be different from each other.

Figure 32:
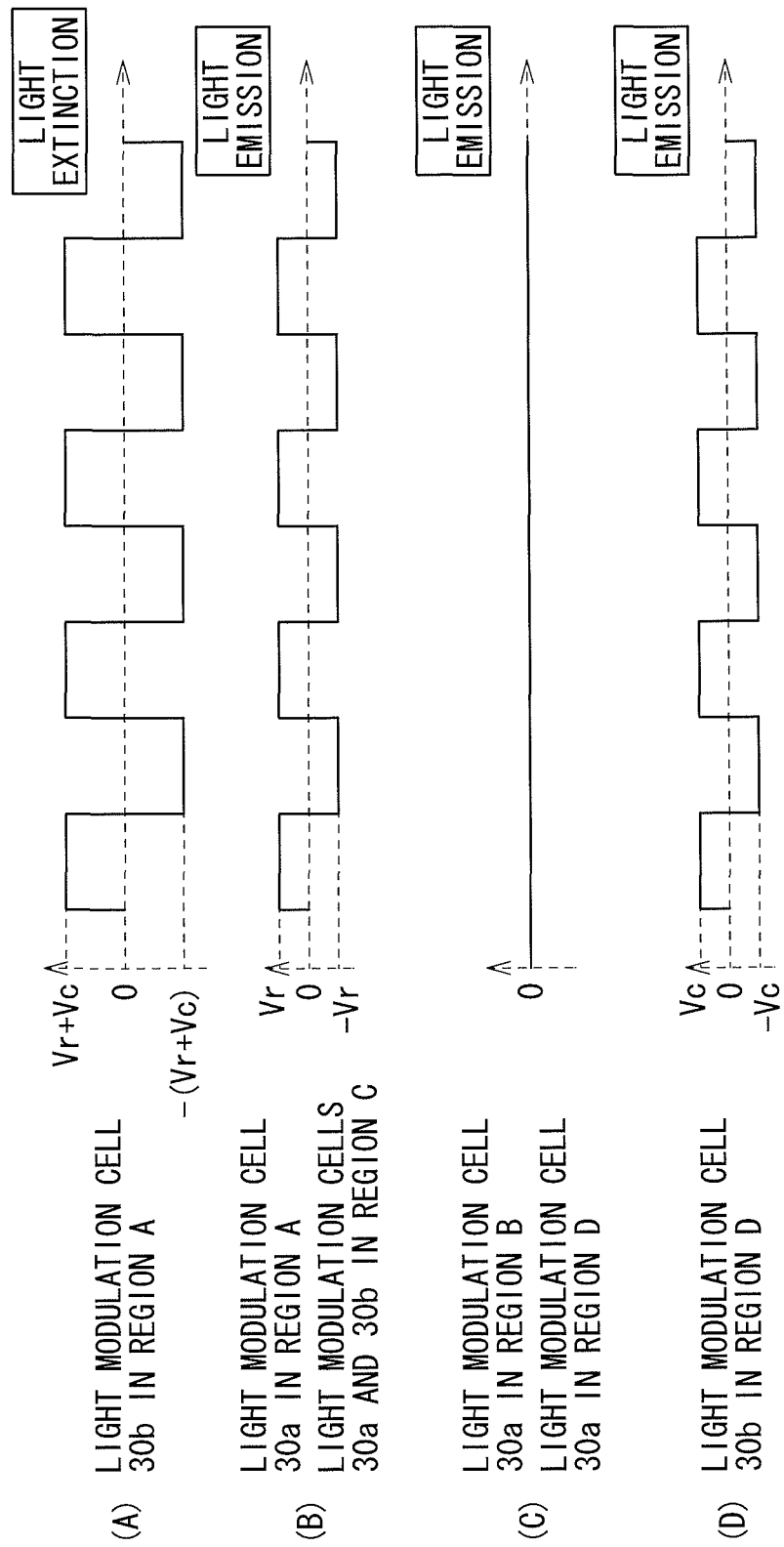
FIG. 32 is a waveform chart illustrating an example of a potential difference applied to the light modulation cell when the backlight is driven by the drive signal illustrated in FIG. 31.
Figure 33:
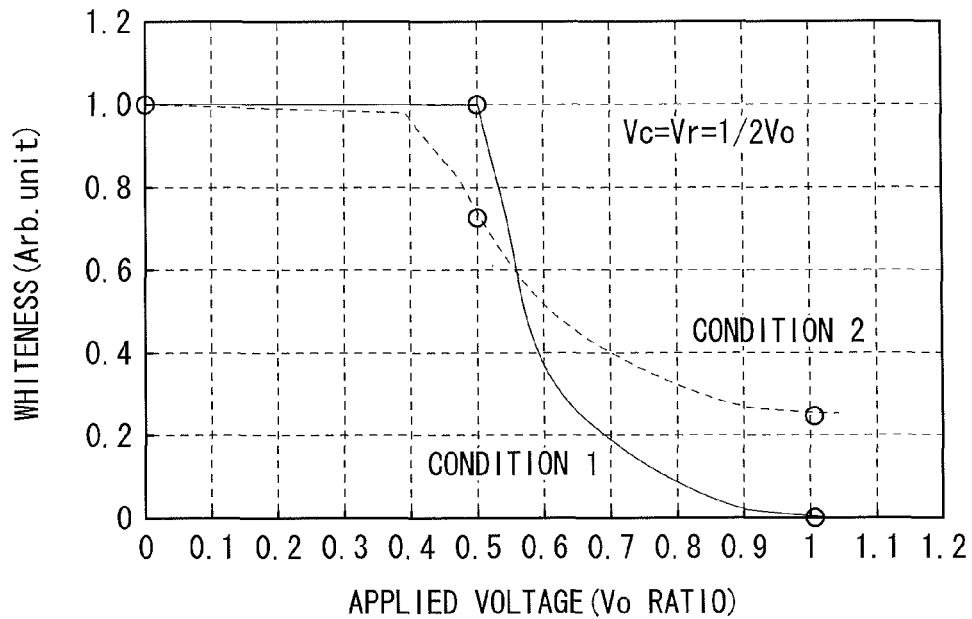
FIG. 33 is a relationship diagram illustrating another example of the relationship between the voltage (applied voltage) applied to the light modulation cell and whiteness of illumination light emitted from the light modulation cell.

FIG. 32 illustrates an example of variations in potentials of the light modulation cells 30a and 30b with time when voltages illustrated in FIG. 31 are applied to the sub-electrodes 32B, 32C, and 36A. As illustrated in parts (A) to (D) in FIG. 32, an AC potential with an amplitude (Vr+Vc) is applied to the light modulation cells 30b in the region A, and an AC potential with the amplitude Vr or the amplitude Vc, or the fixed potential (for example, the ground potential) is applied to the light modulation cells 30a in the region A and the light modulation cells 30a and 30b in the regions B to D. As illustrated in FIG. 33, in the case where a relationship between the voltage (applied voltage) applied to the light modulation cells 30a and 30b and whiteness of illumination light emitted from the light modulation cells 30a and 30b is under a condition 1 illustrated in FIG. 33, the light modulation layers 74 in the light modulation cells 30a in the region A and the light modulation cells 30a and 30b in the regions B to D are turned into transparent regions 30A, and these cells are in a light extinction state. At this time, the light modulation layer 74 in the light modulation cell 30b in the region A is the scattering region 30B, and the light modulation cell 30b in the region A is in a light emission state.

It is to be noted that the relationship between the applied voltage and whiteness is under a condition 2 in FIG. 33, when an AC potential with the amplitude Vr or the amplitude Vc is applied to the light modulation cells 30*a* and 30*b*, whiteness is not 1, and is reduced to approximately a half of 1. Therefore, it is preferable that, when the AC potential with the amplitude Vr or the amplitude Vc is applied to the light modulation cells 30*a* and 30*b*, whiteness be equivalent to luminance when the AC potential with the amplitude (Vr+Vc) is applied. More specifically, the amplitude Vr and the amplitude Vc are preferably equal to or smaller than that of a threshold potential allowing the property of the light modulation layer 74 to be switched from the scattering property to transparency when only the AC potential with the amplitude Vr or the amplitude Vc is applied to the light modulation layer 74.

Next, functions and effects of the backlight 211 according to this embodiment will be described below.

In the backlight 211 according to this embodiment, the light modulation layer 74 exhibiting the scattering property or transparency with respect to light from the light source 20, depending on a potential difference generated by the sub-electrodes 32B, 32C, and 36A is provided in the backlight 211. Therefore, light emitted from the light source 20 and propagating through the transparent substrate 31 and the like passes through a region (the transparent region 30A) exhibiting transparency by potential difference control of the light modulation layer 74 to be totally reflected by a top surface of the light guide plate 10 or to be reflected by the top surface of the light guide plate 10 with high reflectivity. On the other hand, light propagating through the transparent substrate 31 and the like is scattered in a region (the scattering region 30B) exhibiting the scattering property by potential difference control of the light modulation layer 74 to pass through the top surface of the light guide plate 10. Therefore, illumination light is hardly emitted from a region corresponding to the transparent region 30A of the light emission region 211A of the backlight 211. Moreover, illumination light is emitted from a region corresponding to the scattering region 30B of the light emission region of the backlight 211. Thus, in the embodiment, illumination light is emitted from a part of the light modulation layer 74 or the entire light modulation layer 74, depending on the layout of the sub-electrodes 32B, 32C, and 36A and an applied voltage; therefore, switching between three-dimensional display and two-dimensional display is performed. Moreover, in the embodiment, when a two-dimensional image, a three-dimensional image, or an image including a two-dimensional image and a three-dimensional image is displayed on the display panel 210, the sub-electrodes 32B, 32C, and 36A are driven to allow the in-plane distribution of a potential difference between the sub-electrodes 32B or the sub-electrodes 32C and the sub-electrodes 36A to be constant within one frame period. Thus, the numbers of sub-electrodes 32B, 32C, and 36A are not limited by a driving method. Therefore, the numbers of sub-electrodes 32B, 32C, and 36A are increased as necessary to allow a region where illumination light is partially emitted in a plane to be smaller. Thus, illumination light is partially emitted from a smaller region of the plane at low cost.

[Modification]

In the above-described third embodiment, the sub-electrodes 32B and 32C extend in a direction parallel to the Y-axis direction (a direction parallel to the light incident surface 10A); however, as illustrated in FIGS. 21 and 22, the sub-electrodes 32B and 32C may extend in a direction intersecting with the Y-axis direction (a direction intersecting with the light incident surface 10A). In this case, in the region A of the backlight 211, as illustrated in FIG. 23, the linear illumination light beams L1 extend in a direction where the sub-electrodes 32B extend (that is, the direction intersecting with the light incident surface 10A). Moreover, for example, as illustrated in FIGS. 24 and 25, the sub-electrodes 32B and 32C each may have a stepwise shape (a step barrier shape). In this case, in the region A of the backlight 211, as illustrated in FIG. 26, the linear illumination light beams L1 also have a stepwise shape (a step barrier shape). It is to be noted that, in this modification, the widths of the sub-electrodes 32B and 32C are preferably equal to the width of the sub-pixel of R, G, B, or the like of the display panel 210 or an integral multiple of the width of the sub-pixel in terms of moire reduction.

(4. Modifications)

Although the present disclosure is described referring to the embodiments and the modifications thereof, the disclosure is not limited thereto, and may be variously modified.

Figure 34:
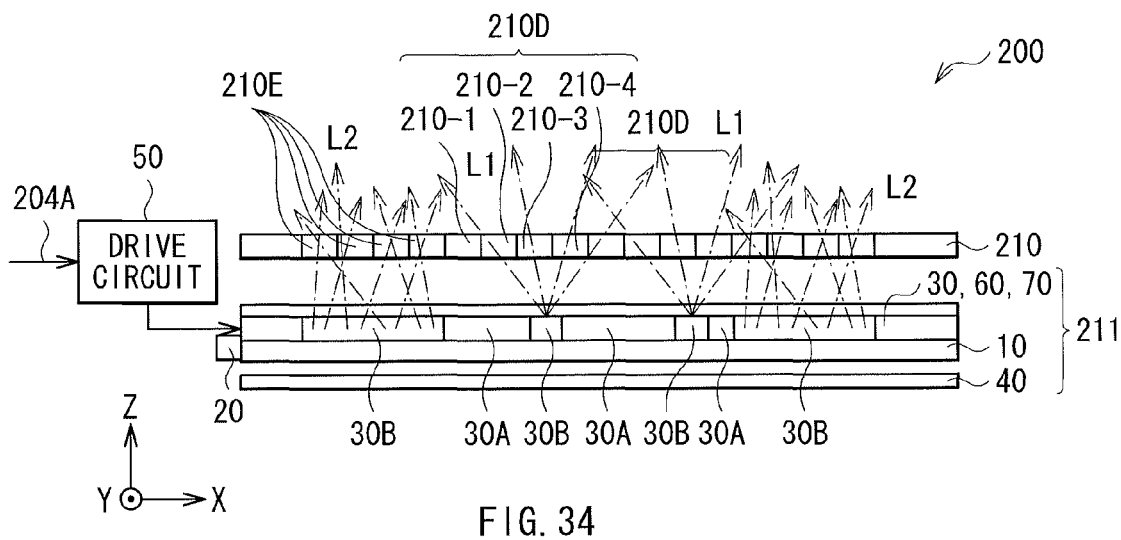
FIG. 34 is a schematic view illustrating an example of a time-divisional drive in three-dimensional display.
Figure 35:
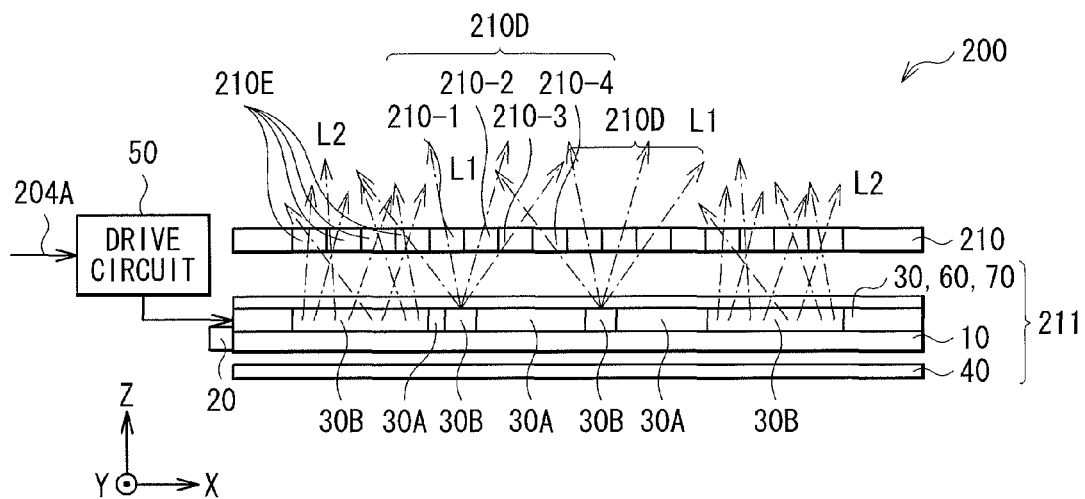
FIG. 35 is a schematic view illustrating an example of a time-divisional drive following FIG. 34.

For example, in the above-described embodiments and the like, as illustrated in FIG. 34 or FIG. 35, the drive circuit 50 may time-divisionally drive the display panel 210. In this case, the drive circuit 50 switches emission points for strip-like illumination light beams from the backlight 211 in synchronization with sequential display switching in the display panel 210 from one pixel row to another in an equal number of pixel rows to the number of parallaxes. For example, the drive circuit 50 switches the emission points for strip-like illumination light beams from the backlight 211 in synchronization with sequential display switching in the display panel 210 from one pixel row to another in four pixel rows within one frame period (for example, 1/60 seconds). At this time, the drive circuit (not illustrated) driving the display panel 210 applies a voltage corresponding to an image signal to each pixel to perform sequential display switching in the display panel 210 from one pixel row to another in an equal number of pixel rows to the number of parallaxes within one frame period. When such switching is performed at high speed, a viewer perceives the number of pixels which is four times as large as the number of pixels illuminating at a moment, thereby allowing substantial resolution to be enhanced.

Figure 36:
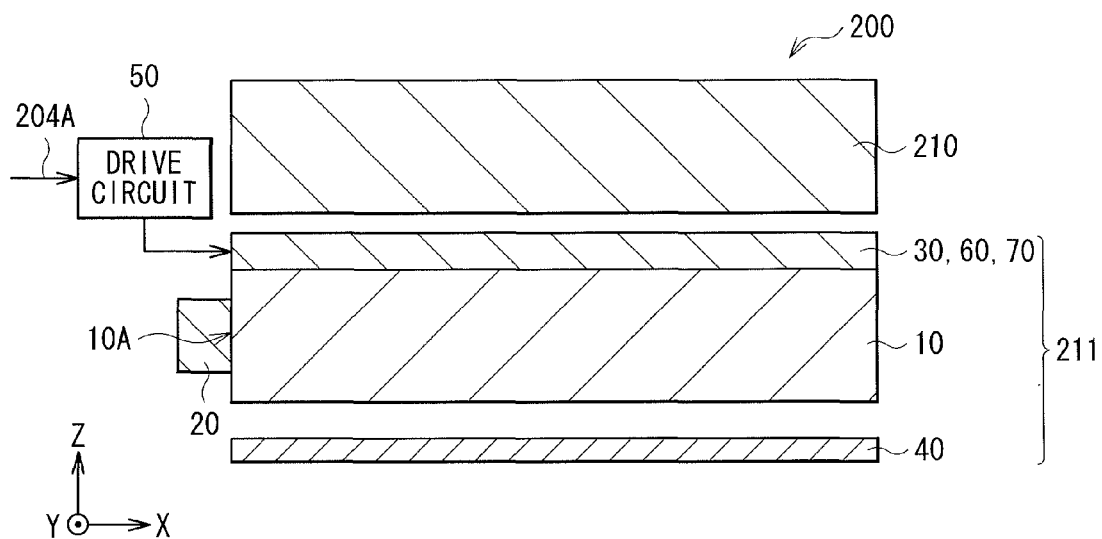
FIG. 36 is a sectional view illustrating a first modification of the configuration of the display section in the receiver-side unit in FIG. 1.
Figure 37:
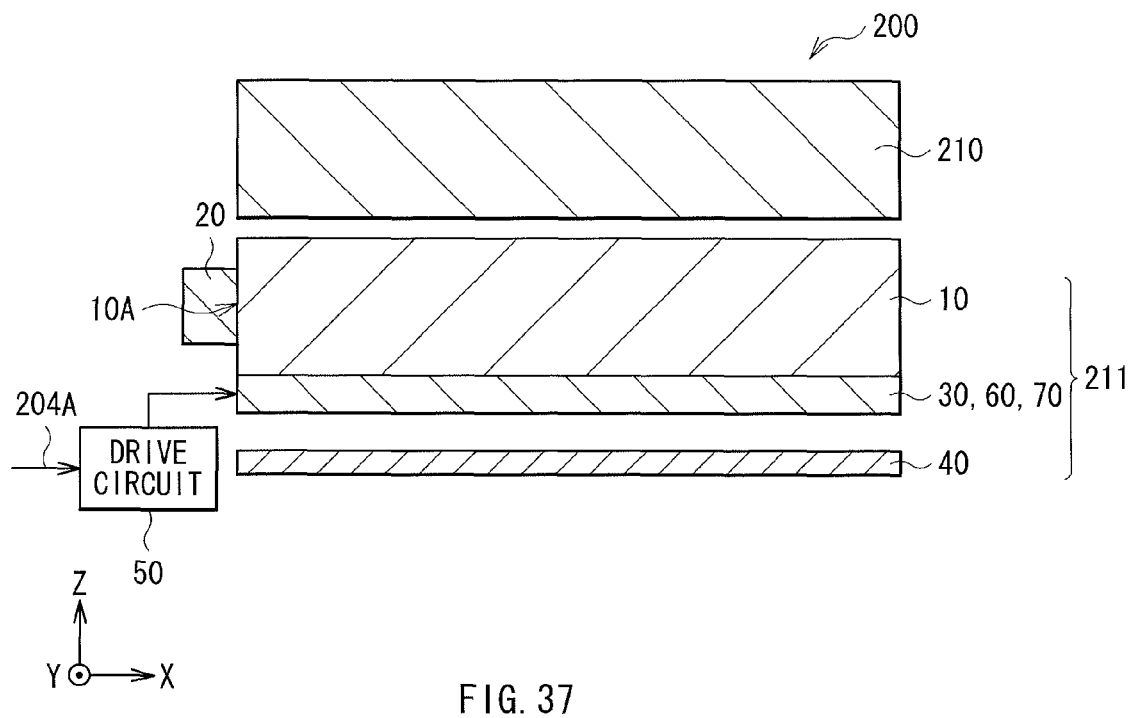
FIG. 37 is a sectional view illustrating a second modification of the configuration of the display section in the receiver-side unit in FIG. 1.
Figure 38:
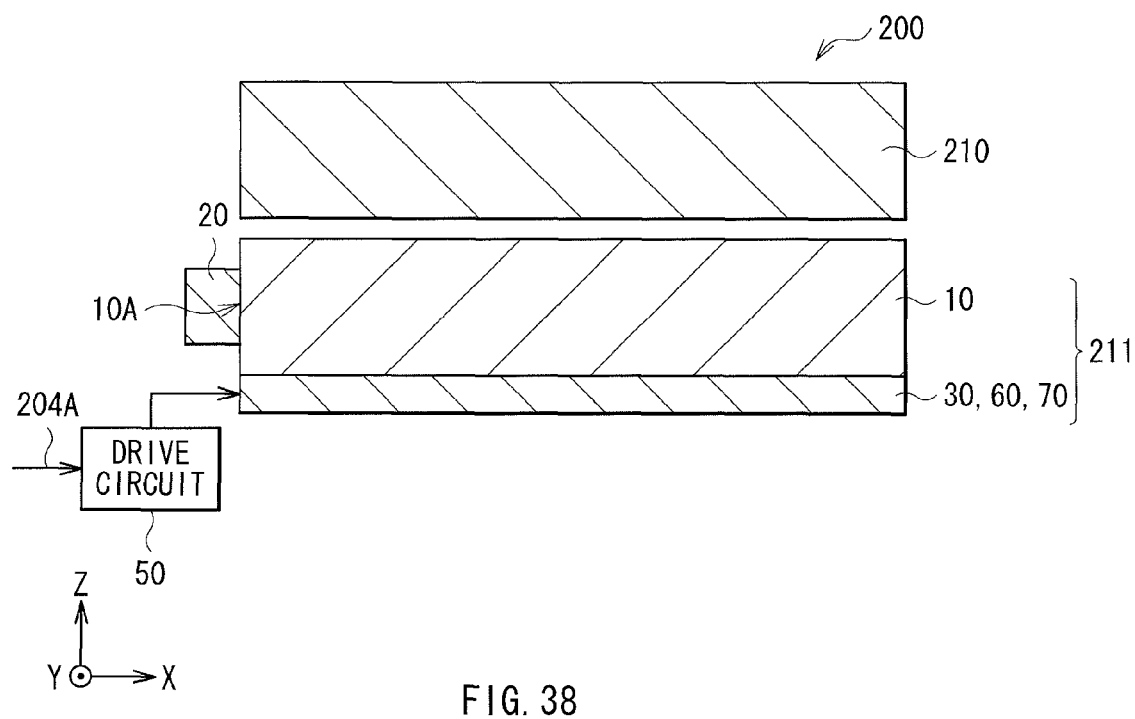
FIG. 38 is a sectional view illustrating a third modification of the configuration of the display section in the receiver-side unit in FIG. 1.

Moreover, in the above-described embodiments and the like, the light modulation devices 30, 60, or 70 is provided inside the light guide plate 10; however, for example, as illustrated in FIG. 36, the light modulation devices 30, 60, or 70 may be in close contact with and be bonded to the top surface of the light guide plate 10 without an air layer in between. Further, for example, as illustrated in FIG. 37, the light modulation devices 30, 60, or 70 may be in close contact with and be bonded to a back side (a bottom surface) of the light guide plate 10 without an air layer in between. In this case, the lower electrode 32 of the light modulation devices 30, 60, or 70 may be made of a light reflective material such as metal. In this case, for example, as illustrated in FIG. 38, the reflective plate 40 may not be included.

Figure 39:
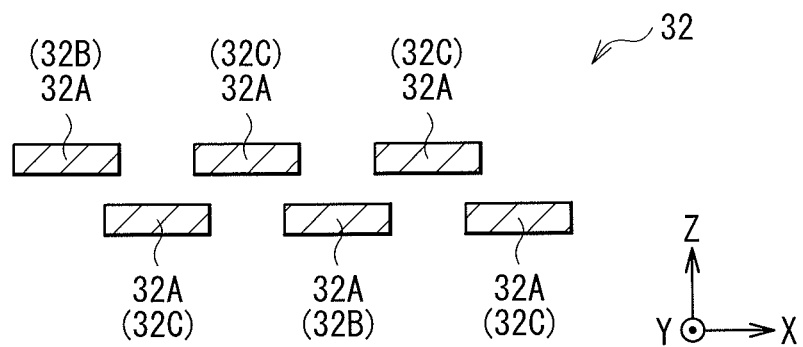
FIG. 39 is a plan view illustrating a third modification of the configuration of the lower electrode in FIGS. 6, 21, and 24.
Figure 40:
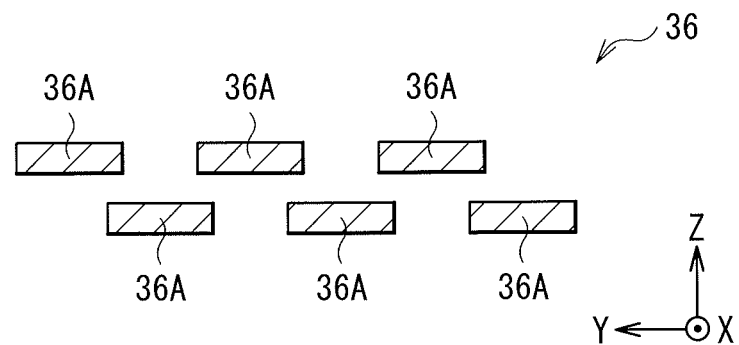
FIG. 40 is a plan view illustrating a first modification of the configuration of the upper electrode in FIGS. 5 and 7.

In the third embodiment, a gap is provided between adjacent sub-electrodes 32A; however, for example, as illustrated in FIG. 39, the adjacent sub-electrodes 32A may overlap each other when viewed from above. Moreover, although not illustrated, adjacent sub-electrodes 32A may be arranged without space therebetween when viewed from above. Further, as illustrated in FIG. 40, adjacent sub-electrodes 36A may overlap each other when viewed from above. Although not illustrated, adjacent sub-electrodes 36A may be arranged without space therebetween when viewed from above.

Figure 41:
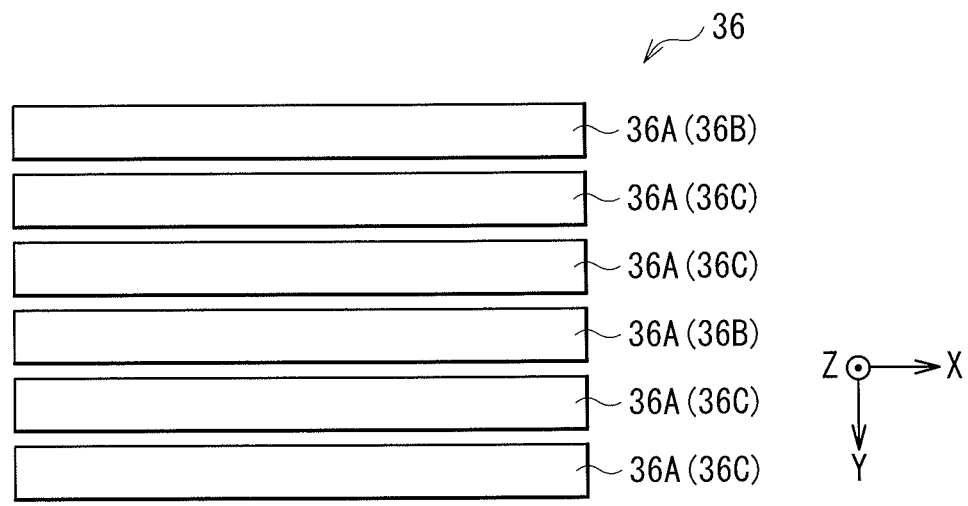
FIG. 41 is a plan view illustrating a second modification of the configuration of the upper electrode in FIGS. 5 and 7.
Figure 42:
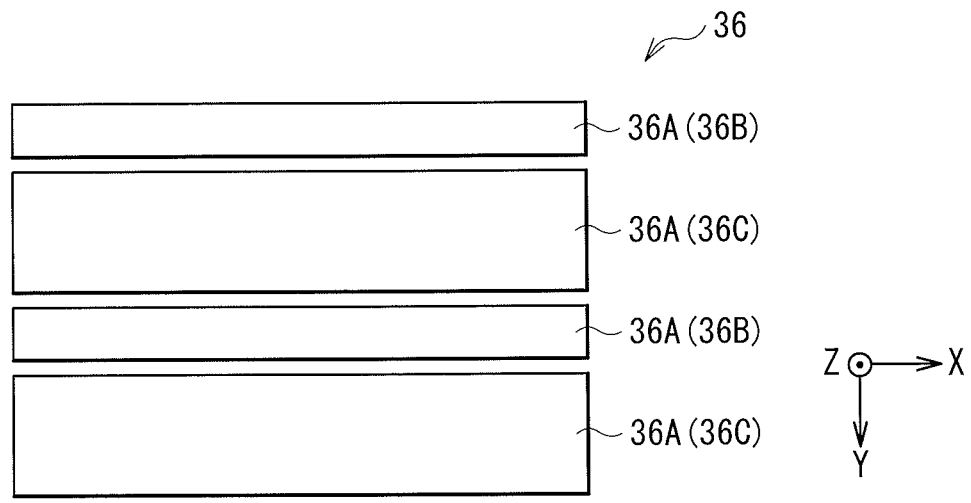
FIG. 42 is a plan view illustrating a third modification of the configuration of the upper electrode in FIGS. 5 and 7.
Figure 43:
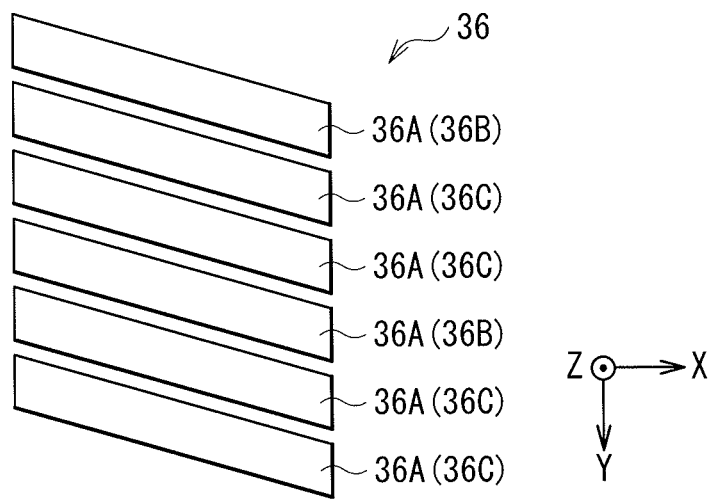
FIG. 43 is a plan view illustrating a fourth modification of the configuration of the upper electrode in FIGS. 5 and 7.
Figure 44:
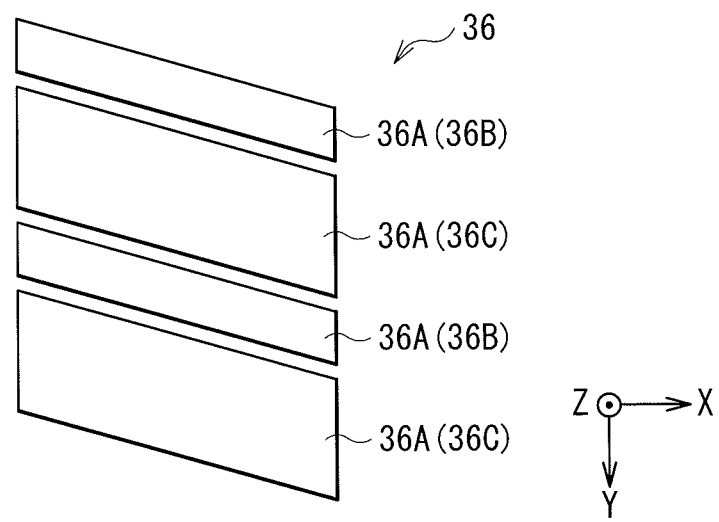
FIG. 44 is a plan view illustrating a fifth modification of the configuration of the upper electrode in FIGS. 5 and 7.
Figure 45:
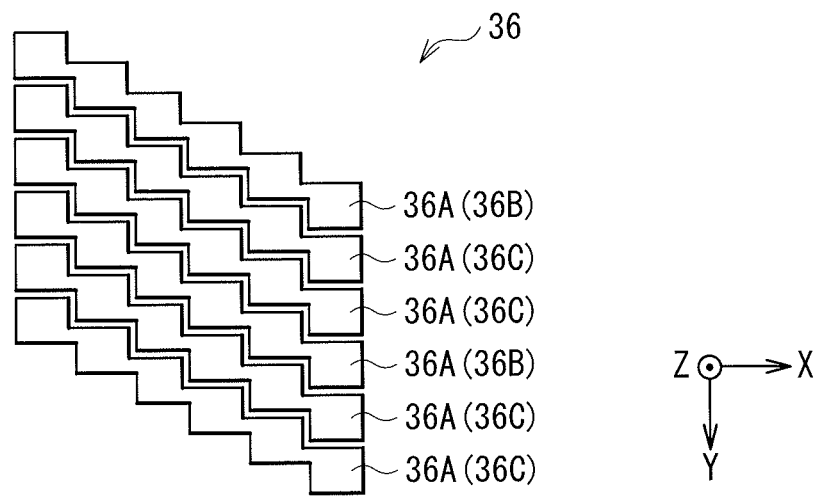
FIG. 45 is a plan view illustrating a sixth modification of the configuration of the upper electrode in FIGS. 5 and 7.
Figure 46:
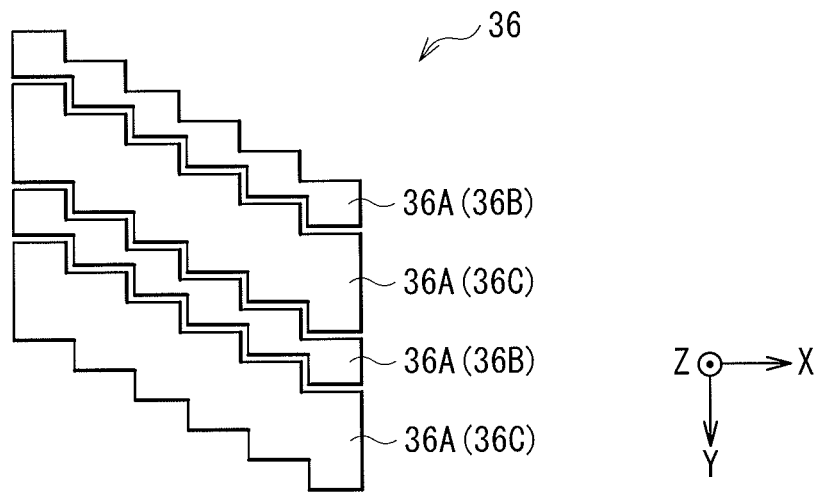
FIG. 46 is a plan view illustrating a seventh modification of the configuration of the upper electrode in FIGS. 5 and 7.

In the above-described embodiments and the like, the drive circuit 50 may apply, to the sub-electrodes 36A, the voltage applied to the sub-electrodes 32A, and may apply, to the sub-electrodes 32A, the voltage applied to the sub-electrodes 36A. For example, as illustrated in FIGS. 41 and 42, in the case where the sub-electrodes 36A include sub-electrodes 36B functioning as the sub-electrodes 32B and sub-electrodes 36C functioning as the sub-electrodes 32C, the drive circuit 50 may apply, to the sub-electrodes 36B, the voltage applied to the sub-electrodes 32B, and may apply, to the sub-electrode 36C, the voltage applied to the sub-electrode 32C. It is to be noted that, for example, as illustrated in FIGS. 43 and 44, the sub-electrodes 36A may extend in a direction intersecting with an X-axis direction (a direction intersecting with the light incident surface 10A at an angle other than an orthogonal angle). Moreover, for example, as illustrated in FIGS. 45 and 46, the sub-electrodes 36A may have a stepwise shape (a step barrier shape). It is to be noted that, in the case where the sub-electrodes 36A have a configuration illustrated in FIGS. 43 to 46, the sub-electrodes 32A preferably extend in the Y-axis direction, as illustrated in FIGS. 6 and 8. Further, in this modification, the widths of the sub-electrodes 36B and 36C are preferably equal to the width of the sub-pixel of R, G, B, or the like of the display panel 210 or an integral multiple of the width of the sub-pixel.

The present disclosure is allowed to have the following configurations.

(1) A display unit including:
a display panel displaying an image;
an illumination device illuminating the display panel; and
a drive circuit driving the display panel and the illumination device,
in which the illumination device includes
a first transparent substrate and a second transparent substrate being separated from and facing each other,
a light source emitting light to an end surface of the first transparent substrate or the second transparent substrate,
a light modulation layer disposed in a gap between the first transparent substrate and the second transparent substrate, and exhibiting a scattering property or transparency with respect to light from the light source, depending on a potential difference, and
a first electrode and a second electrode sandwiching the light modulation layer therebetween,
the first electrode and the second electrode each include a plurality of strip-like electrodes,
the strip-like electrodes of the first electrode and the strip-like electrodes of the second electrode extend in directions intersecting with each other, and
the drive circuit drives the respective strip-like electrodes to allow an in-plane distribution of a potential difference between the strip-like electrodes of the first electrode and the strip-like electrodes of the second electrode to be constant within one frame period, when a two-dimensional image, a three-dimensional image, or an image including a two-dimensional image and a three-dimensional image is displayed on the display panel.

(2) The display unit according to (1), in which
the drive circuit drives the respective strip-like electrodes to emit planar light in a first region corresponding to a two-dimensional image display region, and drives the respective strip-like electrodes to emit linear light in a second region corresponding to a three-dimensional image display region.

(3) The display unit according to (1) or (2), in which
the plurality of strip-like electrodes of the second electrode include a plurality of first strip-like electrodes and a plurality of second strip-like electrodes, the first strip-like electrodes being used to generate the planar light, the second strip-like electrodes being used to generate the planar light and the linear light.

(4) The display unit according to (3), in which
the light modulation layer is in a normally black mode in which the light modulation layer is switched into a scattering state under voltage application and is switched into a transmission state under no voltage application,
the drive circuit applies a fixed potential to strip-like electrodes passing through the second region selected from the plurality of strip-like electrodes of the first electrode and strip-like electrodes passing through the second region selected from the plurality of first strip-like electrodes, when an image including a two-dimensional image and a three-dimensional image is displayed on the display panel, and
the drive circuit applies AC potentials with phases in synchronization with each other to strip-like electrodes not passing through the second region selected from the plurality of strip-like electrodes of the first electrode, strip-like electrodes not passing through the second region selected from the plurality of first strip-like electrodes, and all of the second strip-like electrodes, when the image including the two-dimensional image and the three-dimensional image is displayed on the display panel.

(5) The display unit according to (4), in which
the fixed potential is a ground potential, and
an amplitude (RMS) of each of the AC potentials has a value equal to or larger than that of a threshold potential allowing a property of the light modulation layer to be switched from the transparency to the scattering property when only the AC potential is applied to the light modulation layer.

(6) The display unit according to (3), in which
the light modulation layer is in a normally white mode in which the light modulation layer is switched into a transmission state under voltage application and is switched into a scattering state under no voltage application,
the drive circuit applies a fixed potential to strip-like electrodes not passing through the second region selected from the plurality of strip-like electrodes of the first electrode, all of the second strip-like electrodes, and strip-like electrodes not passing through the second region selected from the plurality of first strip-like electrodes, when an image including a two-dimensional image and a three-dimensional image is displayed on the display panel, and
the drive circuit applies AC potentials with phases in synchronization with each other to strip-like electrodes passing through the second region selected from the plurality of strip-like electrodes of the first electrode, and strip-like electrodes passing through the second region selected from the plurality of first strip-like electrodes, when the image including the two-dimensional image and the three-dimensional image is displayed on the display panel.

(7) The display unit according to (6), in which
the fixed potential is a ground potential, and
an amplitude (RMS) of each of the AC potentials has a value equal to or smaller than that of a threshold potential allowing a property of the light modulation layer to be switched from the transparency to the scattering property when only the AC potential is applied to the light modulation layer.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display unit comprising:
a display panel configured to display an image;
an illumination device configured to illuminate the display panel; and
a drive circuit configured to drive the display panel and the illumination device,
wherein the illumination device includes
a first transparent substrate and a second transparent substrate being separated from and facing each other,
a light source emitting light to an end surface of the first transparent substrate or the second transparent substrate,
a light modulation layer disposed in a gap between the first transparent substrate and the second transparent substrate, and exhibiting a scattering property or transparency with respect to light from the light source, depending on a potential difference, and
a first electrode and a second electrode sandwiching the light modulation layer therebetween,
the first electrode and the second electrode each include a plurality of strip-like electrodes,
the strip-like electrodes of the first electrode and the strip-like electrodes of the second electrode extend in directions intersecting with each other, and
the drive circuit drives the respective strip-like electrodes to allow an in-plane distribution of a potential difference between the strip-like electrodes of the first electrode and the strip-like electrodes of the second electrode to be constant within one frame period, when a two-dimensional image, a three-dimensional image, or an image including a two-dimensional image and a three-dimensional image is displayed on the display panel,
wherein the drive circuit drives the respective strip-like electrodes to emit planar light in a first region corresponding to a two-dimensional image display region, and drives the respective strip-like electrodes to emit linear light in a second region corresponding to a three-dimensional image display region,
wherein the plurality of strip-like electrodes of the second electrode include a plurality of first strip-like electrodes and a plurality of second strip-like electrodes, the first strip-like electrodes being used to generate the planar light, the second strip-like electrodes being used to generate the planar light and the linear light, and
wherein the light modulation layer is in a normally black mode in which the light modulation layer is switched into a scattering state under voltage application and is switched into a transmission state under no voltage application,
the drive circuit applies a fixed potential to strip-like electrodes passing through the second region selected from the plurality of strip-like electrodes of the first electrode and strip-like electrodes passing through the second region selected from the plurality of first strip-like electrodes, when an image including a two-dimensional image and a three-dimensional image is displayed on the display panel, and
the drive circuit applies AC potentials with phases in synchronization with each other to strip-like electrodes not passing through the second region selected from the plurality of strip-like electrodes of the first electrode, strip-like electrodes not passing through the second region selected from the plurality of first strip-like electrodes, and all of the second strip-like electrodes, when the image including the two-dimensional image and the three-dimensional image is displayed on the display panel.

2. The display unit according to claim 1, wherein
the fixed potential is a ground potential, and
an amplitude (RMS) of each of the AC potentials has a value equal to or larger than that of a threshold potential allowing a property of the light modulation layer to be switched from the transparency to the scattering property when only the AC potential is applied to the light modulation layer.

3. The display unit according to claim 1, wherein
the light modulation layer is in a normally white mode in which the light modulation layer is switched into a transmission state under voltage application and is switched into a scattering state under no voltage application,
the drive circuit applies a fixed potential to strip-like electrodes not passing through the second region selected from the plurality of strip-like electrodes of the first electrode, all of the second strip-like electrodes, and strip-like electrodes not passing through the second region selected from the plurality of first strip-like electrodes, when an image including a two-dimensional image and a three-dimensional image is displayed on the display panel, and
the drive circuit applies AC potentials with phases in synchronization with each other to strip-like electrodes passing through the second region selected from the plurality of strip-like electrodes of the first electrode, and strip-like electrodes passing through the second region selected from the plurality of first strip-like electrodes, when the image including the two-dimensional image and the three-dimensional image is displayed on the display panel.

4. The display unit according to claim 3, wherein
the fixed potential is a ground potential, and
an amplitude (RMS) of each of the AC potentials has a value equal to or smaller than that of a threshold potential allowing a property of the light modulation layer to be switched from the transparency to the scattering property when only the AC potential is applied to the light modulation layer.

5. A display unit comprising:
a display panel configured to display an image;
an illumination device configured to illuminate the display panel; and
a drive circuit configured to drive the display panel and the illumination device,
wherein the illumination device includes
a first transparent substrate and a second transparent substrate being separated from and facing each other,
a light source emitting light to an end surface of the first transparent substrate or the second transparent substrate,
a light modulation layer disposed in a gap between the first transparent substrate and the second transparent substrate, and exhibiting a scattering property or transparency with respect to light from the light source, depending on a potential difference, and
a first electrode and a second electrode sandwiching the light modulation layer therebetween,
the first electrode and the second electrode each include a plurality of strip-like electrodes,
the strip-like electrodes of the first electrode and the strip-like electrodes of the second electrode extend in directions intersecting with each other, and
the drive circuit drives the respective strip-like electrodes to allow an in-plane distribution of a potential difference between the strip-like electrodes of the first electrode and the strip-like electrodes of the second electrode to be constant within one frame period, when a two-dimensional image, a three-dimensional image, or an image including a two-dimensional image and a three-dimensional image is displayed on the display panel, wherein the drive circuit drives the respective strip-like electrodes to emit planar light in a first region corresponding to a two-dimensional image display region, and drives the respective strip-like electrodes to emit linear light in a second region corresponding to a three-dimensional image display region, wherein the plurality of strip-like electrodes of the second electrode include a plurality of first strip-like electrodes and a plurality of second strip-like electrodes, the first strip-like electrodes being used to generate the planar light, the second strip-like electrodes being used to generate the planar light and the linear light, and wherein the light modulation layer is in a normally white mode in which the light modulation layer is switched into a transmission state under voltage application and is switched into a scattering state under no voltage application, the drive circuit applies a fixed potential to strip-like electrodes not passing through the second region selected from the plurality of strip-like electrodes of the first electrode, all of the second strip-like electrodes, and strip-like electrodes not passing through the second region selected from the plurality of first strip-like electrodes, when an image including a two-dimensional image and a three-dimensional image is displayed on the display panel, and the drive circuit applies AC potentials with phases in synchronization with each other to strip-like electrodes passing through the second region selected from the plurality of strip-like electrodes of the first electrode, and strip-like electrodes passing through the second region selected from the plurality of first strip-like electrodes, when the image including the two-dimensional image and the three-dimensional image is displayed on the display panel.

6. The display unit according to claim 5, wherein the fixed potential is a ground potential, and an amplitude (RMS) of each of the AC potentials has a value equal to or smaller than that of a threshold potential allowing a property of the light modulation layer to be switched from the transparency to the scattering property when only the AC potential is applied to the light modulation layer.

* * * * *